US012581015B2

(12) United States Patent
Goldshtein et al.

(10) Patent No.: US 12,581,015 B2
(45) Date of Patent: Mar. 17, 2026

(54) AUTOMATING TELEPHONE CALL(S) ON BEHALF OF USER(S)

(71) Applicant: GOOGLE LLC, Mountain View, CA (US)

(72) Inventors: Sasha Goldshtein, Tel Aviv (IL); Yoav Tzur, Tel Aviv (IL)

(73) Assignee: GOOGLE LLC, Mountain View, CA (US)

( * ) Notice: Subject to any disclaimer, the term of this patent is extended or adjusted under 35 U.S.C. 154(b) by 262 days.

(21) Appl. No.: 18/337,283

(22) Filed: Jun. 19, 2023

(65) Prior Publication Data

US 2024/0323276 A1    Sep. 26, 2024

Related U.S. Application Data

(60) Provisional application No. 63/453,695, filed on Mar. 21, 2023.

(51) Int. Cl.
*H04M 3/493*     (2006.01)
*H04M 1/72454*     (2021.01)
*H04M 1/72484*     (2021.01)

(52) U.S. Cl.
CPC ..... *H04M 3/4936* (2013.01); *H04M 1/72454* (2021.01); *H04M 1/72484* (2021.01)

(58) Field of Classification Search
CPC ........... H04M 3/4936; H04M 1/72454; H04M 1/72484
See application file for complete search history.

(56) References Cited

U.S. PATENT DOCUMENTS

| 5,815,566 | A | 9/1998 | Ramot |
| 6,061,433 | A | 5/2000 | Polcyn |
| 6,304,653 | B1 | 10/2001 | O'Neil |

(Continued)

FOREIGN PATENT DOCUMENTS

| CN | 103795877 A | 5/2014 |
| CN | 105592237 A | 5/2016 |

(Continued)

OTHER PUBLICATIONS

European Patent Office; International Search Report and Written Opinion issued in Application No. PCT/US2023/029851; 12 pages; dated Nov. 23, 2023.

(Continued)

*Primary Examiner* — Farid Seyedvosoghi
(74) *Attorney, Agent, or Firm* — Gray Ice Higdon

(57) ABSTRACT

Some implementations receive user input from a user to initiate a telephone call with an entity, and determine whether a voice assistant is able to automate the telephone call with the entity on behalf of the user. In response to determining that the voice assistant is able to automate the telephone call with the entity, these implementations can, prior to the telephone call being initiated, cause an automated telephone call suggestion element to be rendered via the client device. In response to receiving a user selection of the automated telephone call suggestion element, these implementations can determine a task to be performed on behalf of the user during the telephone call, and cause the voice assistant to initiate and conduct the telephone call to perform the task on behalf of the user.

20 Claims, 16 Drawing Sheets

(56) References Cited

U.S. PATENT DOCUMENTS

| | | |
|---|---|---|
| 6,377,567 B1 | 4/2002 | Leonard |
| 6,418,199 B1 | 7/2002 | Perrone |
| 6,731,725 B1 | 5/2004 | Merwin |
| 6,922,465 B1 | 7/2005 | Howe |
| 7,084,758 B1 | 8/2006 | Cole |
| 7,337,158 B2 | 2/2008 | Fratkina |
| 7,539,656 B2 | 5/2009 | Fratkina |
| 7,792,773 B2 | 9/2010 | McCord |
| 7,920,678 B2 | 4/2011 | Cooper |
| 8,345,835 B1 | 1/2013 | Or-Bach |
| 8,594,308 B2 | 11/2013 | Soundar |
| 8,938,058 B2 | 1/2015 | Soundar |
| 8,964,963 B2 | 2/2015 | Soundar |
| 9,001,819 B1 | 4/2015 | Or-Bach |
| 9,098,551 B1 | 8/2015 | Fryz |
| 9,232,369 B1 | 1/2016 | Fujisaki |
| 9,318,108 B2 | 4/2016 | Gruber |
| 9,467,566 B2 | 10/2016 | Soundar |
| 9,473,637 B1 | 10/2016 | Venkatapathy |
| 9,721,570 B1 | 8/2017 | Beal |
| 10,447,860 B1 | 10/2019 | Hartman |
| 11,303,749 B1 | 4/2022 | Baror |
| 2002/0051522 A1 | 5/2002 | Merrow |
| 2002/0055975 A1 | 5/2002 | Petrovykh |
| 2003/0009530 A1 | 1/2003 | Philonenko |
| 2003/0063732 A1 | 4/2003 | Mcknight |
| 2004/0001575 A1 | 1/2004 | Tang |
| 2004/0083195 A1 | 4/2004 | McCord |
| 2004/0213384 A1 | 10/2004 | Alles |
| 2004/0240642 A1 | 12/2004 | Crandell |
| 2005/0147227 A1 | 7/2005 | Chervirala |
| 2005/0175168 A1 | 8/2005 | Summe |
| 2005/0271250 A1 | 12/2005 | Vallone |
| 2006/0039365 A1 | 2/2006 | Ravikumar |
| 2006/0056600 A1 | 3/2006 | Merrow |
| 2006/0215824 A1 | 9/2006 | Mitby |
| 2007/0036320 A1 | 2/2007 | Mandalia |
| 2007/0201664 A1 | 8/2007 | Salafia |
| 2008/0181371 A1 | 7/2008 | Merrow |
| 2008/0209449 A1 | 8/2008 | Maehira |
| 2008/0309449 A1 | 12/2008 | Martin |
| 2009/0022293 A1 | 1/2009 | Routt |
| 2009/0029674 A1 | 1/2009 | Brezina |
| 2009/0089096 A1 | 4/2009 | Schoenberg |
| 2009/0089100 A1 | 4/2009 | Nenov |
| 2009/0137278 A1 | 5/2009 | Haru |
| 2009/0154666 A1 | 6/2009 | Rios |
| 2009/0232295 A1 | 9/2009 | Ryskamp |
| 2010/0088613 A1 | 4/2010 | Deluca |
| 2010/0104087 A1 | 4/2010 | Byrd |
| 2010/0124325 A1 | 5/2010 | Weng |
| 2010/0228590 A1 | 9/2010 | Muller |
| 2010/0272246 A1 | 10/2010 | Malik |
| 2011/0092187 A1 | 4/2011 | Miller |
| 2011/0270687 A1 | 11/2011 | Bazaz |
| 2012/0016678 A1 | 1/2012 | Gruber |
| 2012/0109759 A1 | 5/2012 | Oren |
| 2012/0147762 A1 | 6/2012 | Hancock |
| 2012/0157067 A1 | 6/2012 | Turner |
| 2012/0173243 A1 | 7/2012 | Anand |
| 2012/0271676 A1 | 10/2012 | Aravamudan |
| 2013/0060587 A1 | 3/2013 | Bayrak |
| 2013/0077772 A1 | 3/2013 | Lichorowic |
| 2013/0090098 A1 | 4/2013 | Gidwani |
| 2013/0136248 A1 | 5/2013 | Kaiser-Nyman |
| 2013/0163741 A1 | 6/2013 | Balasaygun |
| 2013/0275164 A1 | 10/2013 | Gruber |
| 2014/0024362 A1 | 1/2014 | Kang |
| 2014/0029734 A1 | 1/2014 | Kim |
| 2014/0037084 A1 | 2/2014 | Siddhartha |
| 2014/0107476 A1 | 4/2014 | Tung |
| 2014/0122077 A1 | 5/2014 | Nishikawa |
| 2014/0122618 A1 | 5/2014 | Duan |
| 2014/0200928 A1 | 7/2014 | Watanabe |

| | | | |
|---|---|---|---|
| 2014/0207882 A1 | 7/2014 | Joo | |
| 2014/0247933 A1 | 9/2014 | Soundar | |
| 2014/0279050 A1 | 9/2014 | Makar | |
| 2014/0280464 A1 | 9/2014 | De Ding | |
| 2014/0310365 A1 | 10/2014 | Sample | |
| 2015/0139413 A1 | 5/2015 | Hewitt | |
| 2015/0142704 A1 | 5/2015 | London | |
| 2015/0150019 A1 | 5/2015 | Sheaffer | |
| 2015/0237203 A1 | 8/2015 | Siminoff | |
| 2015/0248817 A1 | 9/2015 | Steir | |
| 2015/0281446 A1 | 10/2015 | Milstein | |
| 2015/0339707 A1 | 11/2015 | Harrison | |
| 2015/0347399 A1 | 12/2015 | Aue | |
| 2015/0350331 A1 | 12/2015 | Kumar | |
| 2015/0358790 A1 | 12/2015 | Nasserbakht | |
| 2016/0028891 A1 | 1/2016 | Pirat | |
| 2016/0105546 A1 | 4/2016 | Keys | |
| 2016/0139998 A1 | 5/2016 | Dunn | |
| 2016/0198045 A1 | 7/2016 | Kulkarni | |
| 2016/0227033 A1 | 8/2016 | Song | |
| 2016/0227034 A1 | 8/2016 | Kulkarni | |
| 2016/0277569 A1 | 9/2016 | Shine | |
| 2016/0379230 A1 | 12/2016 | Chen | |
| 2017/0037084 A1 | 2/2017 | Fasan | |
| 2017/0039194 A1 | 2/2017 | Tschetter | |
| 2017/0061091 A1 | 3/2017 | Mcelhinney | |
| 2017/0094052 A1 | 3/2017 | Zhang | |
| 2017/0177298 A1 | 6/2017 | Hardee | |
| 2017/0180499 A1 | 6/2017 | Gelfenbeyn | |
| 2017/0289332 A1 | 10/2017 | Lavian | |
| 2017/0358296 A1 | 12/2017 | Segalis | |
| 2017/0359463 A1 | 12/2017 | Segalis | |
| 2017/0359464 A1 | 12/2017 | Segalis | |
| 2017/0365277 A1 | 12/2017 | Park | |
| 2018/0124241 A1 | 5/2018 | Vijaywargi | |
| 2018/0124255 A1 | 5/2018 | Kawamura | |
| 2018/0133900 A1 | 5/2018 | Breazeal | |
| 2018/0220000 A1 | 8/2018 | Segalis | |
| 2018/0227416 A1 | 8/2018 | Segalis | |
| 2018/0227417 A1 | 8/2018 | Segalis | |
| 2018/0227418 A1 | 8/2018 | Segalis | |
| 2018/0255178 A1 | 9/2018 | Deng | |
| 2018/0316630 A1 | 11/2018 | Jacobson | |
| 2019/0281159 A1 | 9/2019 | Segalis | |
| 2019/0306314 A1 | 10/2019 | Segalis | |
| 2020/0042597 A1 | 2/2020 | Wu | |
| 2020/0075003 A1* | 3/2020 | Kim | G06N 3/0442 |
| 2020/0314246 A1 | 10/2020 | Hart | |
| 2022/0051664 A1* | 2/2022 | Baror | G06F 3/0482 |
| 2023/0145947 A1* | 5/2023 | Nguyen | H04M 1/72469 |
| | | | 455/414.1 |
| 2024/0205331 A1* | 6/2024 | Tzur | H04M 3/493 |

FOREIGN PATENT DOCUMENTS

| | | | |
|---|---|---|---|
| EP | 1679693 A1 | 7/2006 | |
| JP | 2004508748 A | 3/2004 | |
| JP | 2007219385 A | 8/2007 | |
| JP | 2007524928 A | 8/2007 | |
| JP | 2008015439 A | 1/2008 | |
| JP | 2009210703 A | 9/2009 | |
| JP | 2015070371 A | 4/2015 | |
| KR | 20130099423 A | 9/2013 | |
| KR | 20140121105 A | 10/2014 | |
| WO | 2007065193 A1 | 6/2007 | |
| WO | 2014197635 A2 | 12/2014 | |
| WO | 2021188126 A1 | 9/2021 | |
| WO | 2022076009 A1 | 4/2022 | |

OTHER PUBLICATIONS

Leviathan, Yaniv et al. Google Duplex: An AI System for Accomplishing Real-World Tasks Over the Phone; Google AI Blog; 7 pages; dated May 8, 2018.

* cited by examiner

4

400

Automated call assistant can follow up on your voicemail from Example Cafe

414

*Their voicemail:*

*"Hey, this is Jennie from Example Cafe. You have a reservation for three tomorrow and we need you to confirm it by 8pm or it will be cancelled. Thank you!"*

416

*I want to confirm my reservation for tomorrow*

418

420

500

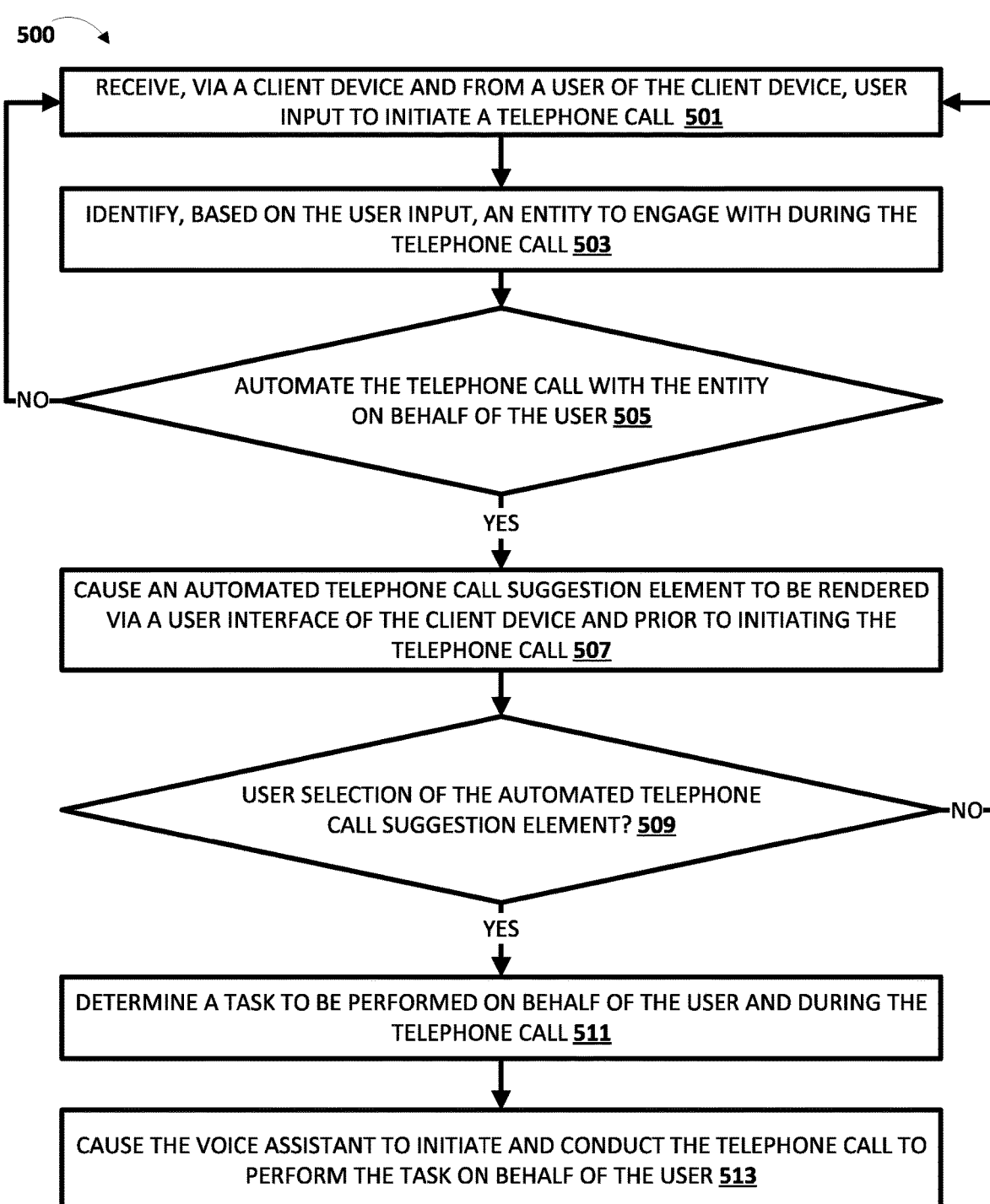

RECEIVE, VIA A CLIENT DEVICE AND FROM A USER OF THE CLIENT DEVICE, USER INPUT TO INITIATE A TELEPHONE CALL 501

IDENTIFY, BASED ON THE USER INPUT, AN ENTITY TO ENGAGE WITH DURING THE TELEPHONE CALL 503

AUTOMATE THE TELEPHONE CALL WITH THE ENTITY ON BEHALF OF THE USER 505

NO

YES

CAUSE AN AUTOMATED TELEPHONE CALL SUGGESTION ELEMENT TO BE RENDERED VIA A USER INTERFACE OF THE CLIENT DEVICE AND PRIOR TO INITIATING THE TELEPHONE CALL 507

USER SELECTION OF THE AUTOMATED TELEPHONE CALL SUGGESTION ELEMENT? 509

NO

YES

DETERMINE A TASK TO BE PERFORMED ON BEHALF OF THE USER AND DURING THE TELEPHONE CALL 511

CAUSE THE VOICE ASSISTANT TO INITIATE AND CONDUCT THE TELEPHONE CALL TO PERFORM THE TASK ON BEHALF OF THE USER 513

FIG. 5

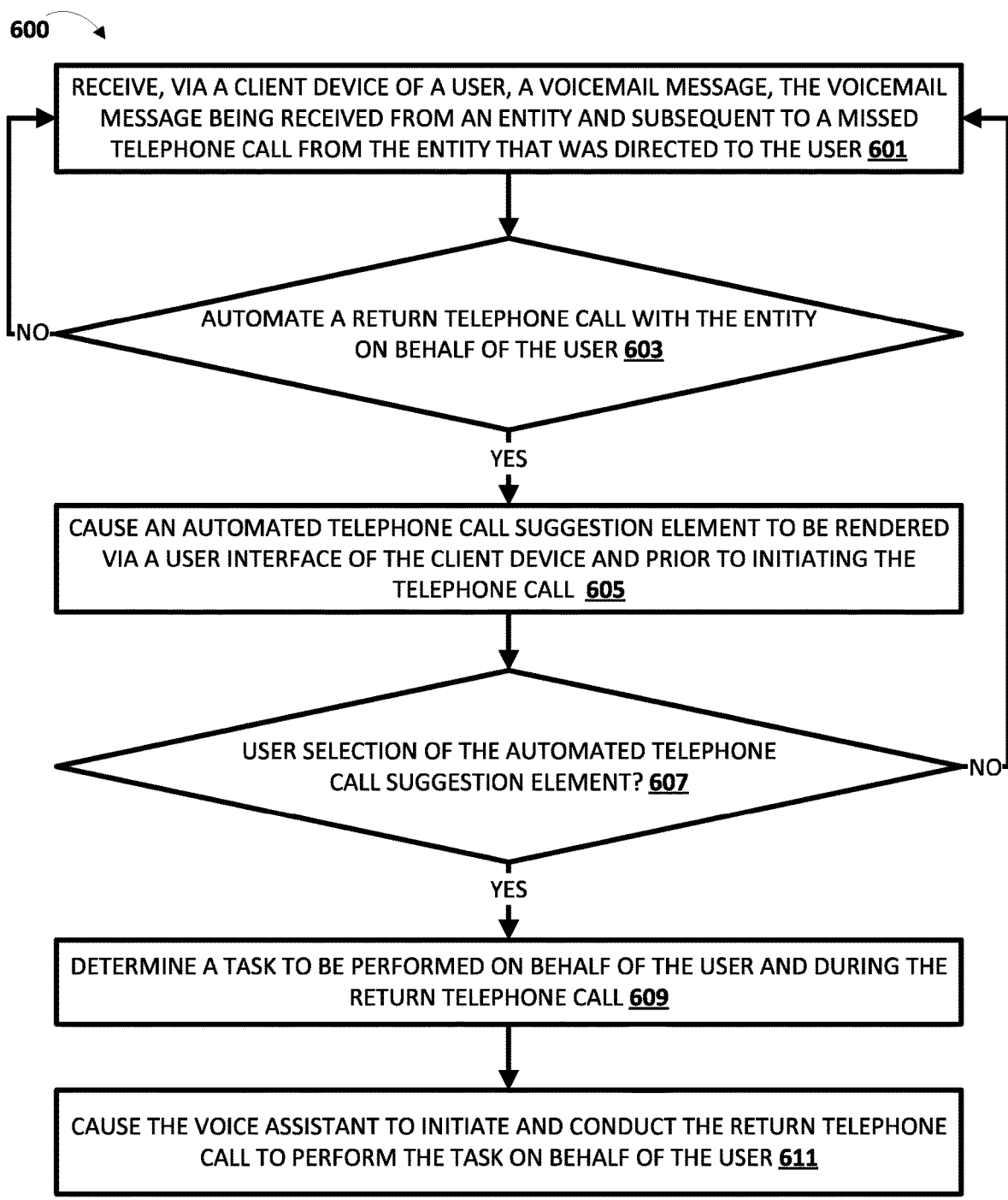

600

RECEIVE, VIA A CLIENT DEVICE OF A USER, A VOICEMAIL MESSAGE, THE VOICEMAIL MESSAGE BEING RECEIVED FROM AN ENTITY AND SUBSEQUENT TO A MISSED TELEPHONE CALL FROM THE ENTITY THAT WAS DIRECTED TO THE USER 601

AUTOMATE A RETURN TELEPHONE CALL WITH THE ENTITY ON BEHALF OF THE USER 603

NO

YES

CAUSE AN AUTOMATED TELEPHONE CALL SUGGESTION ELEMENT TO BE RENDERED VIA A USER INTERFACE OF THE CLIENT DEVICE AND PRIOR TO INITIATING THE TELEPHONE CALL 605

USER SELECTION OF THE AUTOMATED TELEPHONE CALL SUGGESTION ELEMENT? 607

NO

YES

DETERMINE A TASK TO BE PERFORMED ON BEHALF OF THE USER AND DURING THE RETURN TELEPHONE CALL 609

CAUSE THE VOICE ASSISTANT TO INITIATE AND CONDUCT THE RETURN TELEPHONE CALL TO PERFORM THE TASK ON BEHALF OF THE USER 611

FIG. 6

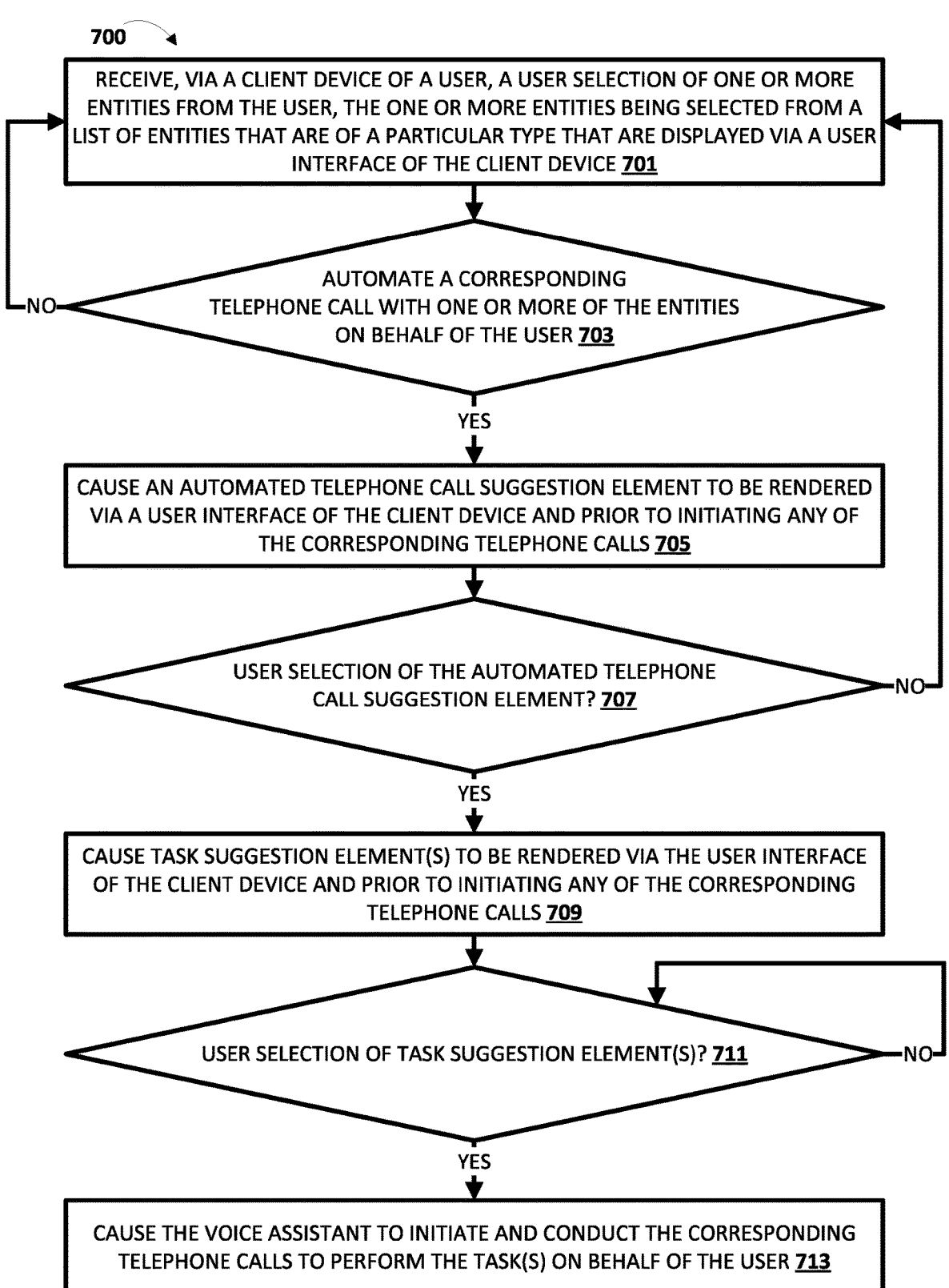

700

RECEIVE, VIA A CLIENT DEVICE OF A USER, A USER SELECTION OF ONE OR MORE ENTITIES FROM THE USER, THE ONE OR MORE ENTITIES BEING SELECTED FROM A LIST OF ENTITIES THAT ARE OF A PARTICULAR TYPE THAT ARE DISPLAYED VIA A USER INTERFACE OF THE CLIENT DEVICE 701

AUTOMATE A CORRESPONDING TELEPHONE CALL WITH ONE OR MORE OF THE ENTITIES ON BEHALF OF THE USER 703

NO

YES

CAUSE AN AUTOMATED TELEPHONE CALL SUGGESTION ELEMENT TO BE RENDERED VIA A USER INTERFACE OF THE CLIENT DEVICE AND PRIOR TO INITIATING ANY OF THE CORRESPONDING TELEPHONE CALLS 705

USER SELECTION OF THE AUTOMATED TELEPHONE CALL SUGGESTION ELEMENT? 707

NO

YES

CAUSE TASK SUGGESTION ELEMENT(S) TO BE RENDERED VIA THE USER INTERFACE OF THE CLIENT DEVICE AND PRIOR TO INITIATING ANY OF THE CORRESPONDING TELEPHONE CALLS 709

USER SELECTION OF TASK SUGGESTION ELEMENT(S)? 711

NO

YES

CAUSE THE VOICE ASSISTANT TO INITIATE AND CONDUCT THE CORRESPONDING TELEPHONE CALLS TO PERFORM THE TASK(S) ON BEHALF OF THE USER 713

FIG. 7

AUTOMATING TELEPHONE CALL(S) ON BEHALF OF USER(S)

BACKGROUND

Humans (also referred to as "users") can initiate telephone calls with entities in a variety of manners. For example, users can initiate telephone calls manually by dialing a telephone number associated with an entity via a telephone software application, selecting a contact entry associated with an entity via the telephone software application or a contacts software application, directing input to a call selectable element via a web browser application, and/or by other means. The entities may employ different mechanisms to respond to the telephone calls initiated by the users. For example, some entities employ human representatives to engage in corresponding conversations with the users. As another example, some entities employ interactive voice response (IVR) systems to engage in corresponding conversations with the users, where these IVR systems provide pre-recorded messages to interact with the users.

In many instances, a voice assistant can automate these telephone calls on behalf of the users to interact with the human representations, IVR systems, and/or other mechanisms. However, the users may not know that the voice assistant is able to initiate and/or conduct these telephone calls on behalf of the users. However, the users may have a long wait time if the human representatives are busy answering telephone calls or handling other requests or the users have to provide additional inputs to interact with the IVR systems. As a result, telephone network traffic can be unnecessarily increased, and computational or network resources can be wasted in initiating or staying in the telephone calls.

SUMMARY

Implementations disclosed herein are directed to an automated telephone call system. The automated telephone call system can, for instance, include an automated call assistant (also be referred to as a "voice assistant" or "automated assistant") that can initiate and conduct a telephone call on behalf of a user and in an automated manner in response to receiving a user selection of an automated telephone call suggestion element. The automated telephone call suggestion element can be rendered at a user interface of a client device of the user in response to determining that the automated call assistant is able to automate the telephone call on behalf of the user, and prior to the telephone call being initiated. For example, assume that the user provides user input to initiate a telephone call with an entity (e.g., a business, an organization, an individual, etc.). Based on the automated call assistant determining that it is able to automate the telephone call on behalf of the user, the automated call assistant can offer to handle the telephone call on behalf of the user via the automated telephone call suggestion element and prior to the telephone call being initiated. Further assume that the user provides a user selection of the automated telephone call suggestion element. Subsequent to the user selection, the automated call assistant can determine a task to be performed during the telephone call, and then initiate and conduct the telephone call on behalf of the user to perform the task.

In some implementations, in determining the task to be performed on behalf of the user and during the telephone call, the automated call assistant can cause a natural language input field to be graphically rendered via the user interface of the client device. In these implementations, if the user provides natural language input via the natural language input field, the automated call assistant can determine the task to be performed on behalf of the user and during the telephone call, based on natural language input provided by the user via the natural language input field. The natural language input provided by the user can include, for example, spoken input captured in audio data generated via microphone(s) of the client device and/or typed input captured in textual data generated via a user interface input component of the client device (e.g., a touch-sensitive display, a keyboard, etc.).

In additional or alternative implementations, in determining the task to be performed on behalf of the user and during the telephone call, the automated call assistant can identify one or more tasks based on one or more prior interactions between the user and the entity, such as a prior electronic communication received from the entity, a prior telephone call with the entity, a search result associated with the entity, etc. Based on the identified one or more tasks, the automated call assistant can generate one or more task suggestion elements for one or more of the tasks. Each of the one or more task suggestion elements can be selectable and, when selected, causes a respective task of the identified one or more tasks to be determined as the task to be performed on behalf of the user and during the telephone call. The automated call assistant can cause the one or more task suggestion elements to be rendered via the user interface of the client device to enable the user to provide a user selection thereof. For instance, the user can select a particular task suggestion element, of the one or more task suggestion elements, that suggests a particular task. In this instance, the automated call assistant can determine, based on the user selecting the particular task suggestion element, the particular task as the task to be performed on behalf of the user and during the telephone call. The user selection provided by the user can include, for example, a voice selection input captured in audio data generated via microphone(s) of the client device and/or a touch selection captured in touch data generated via a user interface input component of the client device (e.g., a touch-sensitive display, a keyboard, etc.).

In additional or alternative implementations, in determining the task to be performed on behalf of the user and during the telephone call, the automated call assistant can identify one or more tasks based on a type of the entity to be engaged with during the telephone call. For example, if the entity is a delivery service type of entity, then the automated call assistant can identify a delivery status update task, a cancel delivery task, and/or other tasks associated with the delivery service type of entity as the one or more tasks. Also, for example, if the entity is a restaurant type of entity, then the automated call assistant can identify a restaurant reservation task, a reservation confirmation task, and/or other tasks associated with the restaurant type of entity. In these implementations, the one or more prior interactions can include a prior message or call the user received from the entity (or the user sent to the entity), a browsing history of the user, or a searching history of the user. Based on the identified one or more tasks, the automated call assistant can generate one or more task suggestion elements for one or more of the tasks as described above.

In some implementations, the automated call assistant can automate the telephone call by identifying a telephone number that is associated with the entity and initiate the telephone call using the telephone number that is associated with the entity. If the telephone call is initiated successfully (e.g., a human representative or IVR system associated with the entity answers the telephone call), the automated call assistant can cause one or more instances of synthesized speech audio data to be audibly rendered via one or more speakers of an additional client device that is associated with the entity. The one or more instances of synthesized speech audio data can be generated (e.g., using a text-to-speech model) to capture synthesized speech of the automated call assistant that is based on the task. In some implementations, one or more of the instances of synthesized speech audio data can be generated during the telephone call. In additional or alternative implementations, one or more of the instances of synthesized speech audio data can be generated prior to the telephone call being initiated.

In various implementations, the telephone call between the automated call assistant and a representative of the entity (e.g., a human representative or IVR system) of the entity can be transcribed. For instance, a transcription of the telephone call can be generated based on the aforementioned one or more instances of synthesized speech audio data and based on one or more instances of audio data that capture speech of the representative of the entity during the telephone call. In some versions of these implementations, the transcription of the telephone call can be rendered visually via the user interface of the client device. The transcription of the telephone call can be visually rendered for presentation to the user during the telephone call and be updated as the telephone call progresses. In additional or alternative versions of these implementations, the transcription of the telephone call can be rendered visually for presentation to the user after the telephone call is ended/terminated. In additional or alternative implementations, and in lieu of an explicit transcription of the telephone call, a summary of the telephone call, actions performed by the automated call assistant during the telephone call, and/or other content related to the telephone call can be visually rendered for presentation to the user as the telephone call progresses and/or after the telephone call is ended/terminated.

In some implementations, and subsequent to the automated call assistant initiating the telephone call, a call participation suggestion element can be visually rendered via the client device. The call participation suggestion element can be selectable and, when selected, causes the user to join the telephone call between the automated call assistant and the representative of the entity. Thus, the user can intervene in the telephone call if needed.

In some implementations, the automated call assistant can determine operating hours that are associated with the entity prior to initiating the telephone call. In these implementations, and in response to determining that a current time is not within the operating hours of the entity, the automated call assistant can delay initiating the telephone call until a future time that is within the operating hours of the entity.

By using techniques described herein, one or more technical advantages can be achieved. As one non-limiting example, techniques described herein eliminate and/or mitigate instances where computational and/or network resources are unnecessarily wasted in calling a phone number at inappropriate time or staying in a telephone call to wait for the entity (or a representative of the entity) to become available in answering the telephone call. Moreover, by recommending one or more tasks for selection by a user and/or providing an input field to receive user description of a task to be performed prior to actual initiation of one or more telephone calls, the automated call assistant can interact with the entity on behalf of the user to conclude the telephone call on behalf of the user in a quick and efficient manner. Accordingly, the user need not manually proceed with initiating the telephone call with the entity, thereby reducing consumption of computational and/or network resources and reducing telephone network traffic.

The above description is provided as an overview of only some implementations disclosed herein. Those implementations, and other implementations, are described in additional detail herein.

BRIEF DESCRIPTION OF THE DRAWINGS

FIG. 5 depicts a flowchart illustrating an example method of an automated call assistant automating a telephone call on behalf of a user, in accordance with various implementations.

FIG. 6 depicts a flowchart illustrating another example method of an automated call assistant automating a telephone call on behalf of a user, in accordance with various implementations.

FIG. 7 depicts a flowchart illustrating yet another example method of an automated call assistant automating a telephone call on behalf of a user, in accordance with various implementations.

DETAILED DESCRIPTION

The following description with reference to the accompanying drawings is provided for understanding of various implementations of the present disclosure. It's appreciated that different features from different implementations may be combined with and/or exchanged for one another. In addition, those of ordinary skill in the art will recognize that various changes and modifications of the various implementations described herein can be made without departing from the scope and spirit of the present disclosure. Descriptions of well-known or repeated functions and constructions may be omitted for clarity and conciseness.

The terms and words used in the following description and claims are not limited to the bibliographical meanings, and are merely used to enable a clear and consistent understanding of the present disclosure. Accordingly, it should be apparent to those skilled in the art that the following description of various implementations of the present disclosure is provided for the purpose of illustration only and not for the purpose of limiting the present disclosure as defined by the appended claims and their equivalents.

Figure 1:
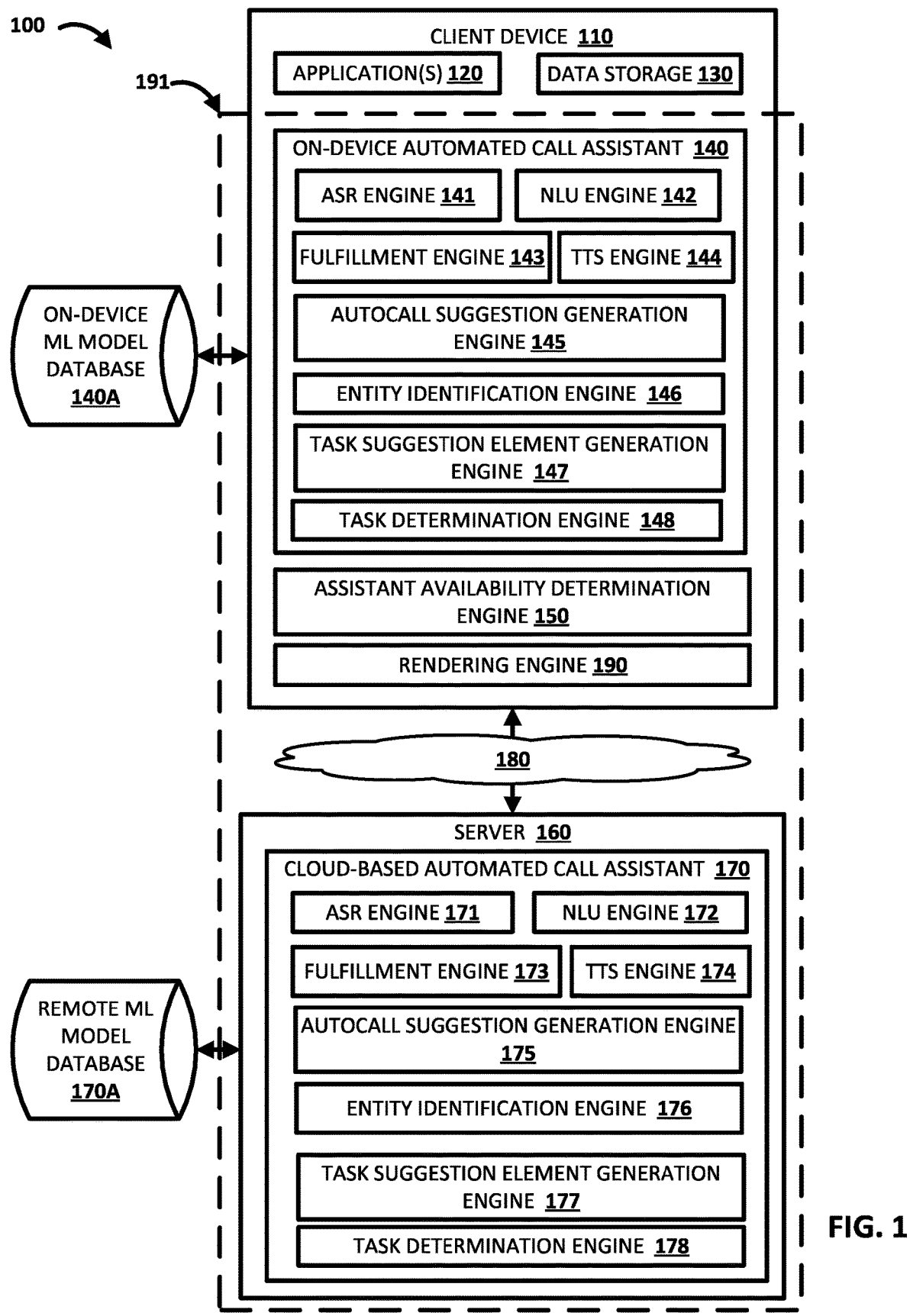
FIG. 1 depicts a block diagram of an example environment that demonstrates various aspects of the present disclosure, and in which implementations disclosed herein can be implemented.

Turning now to FIG. 1, a block diagram of an example environment 100 that demonstrates various aspects of the present disclosure, and in which implementations disclosed herein can be implemented is depicted. A client device 110 is illustrated in FIG. 1, and includes, in various implementations, one or more applications 120 (e.g., a messaging application, a telephone application, a maps or navigation application, etc.), a data storage 130, an on-device automated call assistant 140, an assistant availability determination engine 150, and a rendering engine 190. The client device 110 can be in communication with a server 160 that includes a cloud-based automated call assistant 170, via one or more networks 180. As described herein, the on-device automated call assistant 140 can be utilized to initiate and conduct telephone calls on behalf of the user of the client device 110 locally at the client device 110, and the cloud-based automated call assistant 170 can be utilized to initiate and conduct telephone calls on behalf of the user of the client device 110 remotely from the client device 110. Accordingly, the on-device automated call assistant 140 and the cloud-based automated call assistant 170 can be referred to collectively as an automated call assistant 191.

The client device 110 can be, for example, a cell phone, a stand-alone interactive speaker, a computer (e.g., laptop, desktop, notebook), a tablet, a smart appliance (e.g., smart TV), a messaging device, an in-vehicle device (e.g., in-vehicle navigation system or in-vehicle entertainment system), a wearable device (e.g., watch or glasses), a virtual reality (VR) device, an augmented reality (AR) device, or a personal digital assistant (PDA), and the present disclosure is not limited thereto. The one or more networks 180 can include, for example, a local area network (LAN), a wide area network (WAN) such as the Internet, and/or any other appropriate network. The server 160 can be, for example, a high performance server or cluster of high performance servers.

In various implementations, the on-device automated call assistant 140 can include an automatic speech recognition (ASR) engine 141, a natural language understanding (NLU) engine 142, a fulfillment engine 143, and a text-to-speech (TTS) engine 144. The ASR engine 141, the NLU engine 142, the fulfillment engine 143, and/or the TTS engine 144 can utilize various on-device machine learning (ML) models (e.g., stored in an on-device ML model database 140A) to process one or more inputs locally at the client device 110 and to generate corresponding outputs locally at the client device 110 and based on processing the one or more inputs. Similarly, the cloud-based automated call assistant 170 can include an ASR engine 171, an NLU engine 172, a fulfillment engine 173, and a TTS engine 174. The ASR engine 171, the NLU engine 172, the fulfillment engine 173, and/or the TTS engine 174 can be utilize various remote ML models (e.g., stored in a remote ML model database 170A) to process one or more inputs remotely at the server 160 and to generate corresponding outputs remotely at the server and based on processing the one or more inputs.

In various implementations, the ASR engine 141 and/or 171 can process, using ASR model(s) stored in the on-device ML model database 140A (e.g., a recurrent neural network (RNN) model, a transformer model, and/or any other type of ML model capable of performing ASR), audio data that captures spoken utterances and that is generated by microphone(s) of the client device 110 to generate ASR output. Further, the NLU engine 142 and/or 172 can process, using NLU model(s) stored in the on-device ML model database 140A (e.g., a long short-term memory (LSTM), gated recurrent unit (GRU), and/or any other type of RNN or other ML model capable of performing NLU) and/or NLU rule(s), the ASR output (or other typed or touch inputs received via the client device 110) to generate NLU output. Moreover, the fulfillment engine 143 and/or 173 can process, using fulfillment model(s) and/or fulfillment rules stored in the respective ML model(s) databases, the NLU data to generate fulfillment output. Additionally, the TTS engine 144 and/or 174 can process, using TTS model(s) stored in the respective ML model(s) databases, textual data to generate synthesized speech audio data that includes computer-generated synthesized speech corresponding to the textual data.

In various implementations, the ASR output can include, for example, a plurality of speech hypotheses (e.g., term hypotheses and/or transcription hypotheses) for spoken utterances based on the processing of the audio data, and can optionally select a particular speech hypotheses as recognized text for the spoken input based on a corresponding value associated with each of the plurality of speech hypotheses (e.g., probability values, log likelihood values, and/or other values). In various implementations, the ASR model(s) stored in the respective ML model databases are end-to-end speech recognition model(s), such that the ASR engine 141 and/or 171 can generate the plurality of speech hypotheses directly using the respective ASR models. For instance, the ASR model(s) can be end-to-end model(s) used to generate each of the plurality of speech hypotheses on a character-by-character basis (or other token-by-token basis). One non-limiting example of such end-to-end model(s) used to generate the recognized text on a character-by-character basis is a recurrent neural network transducer (RNN-T) model. An RNN-T model is a form of sequence-to-sequence model that does not employ attention mechanisms.

In other implementations, the ASR model(s) are not end-to-end speech recognition model(s) such that the ASR engine 141 and/or 171 can instead generate predicted phoneme(s) (and/or other representations). For instance, the predicted phoneme(s) (and/or other representations) may then be utilized by the ASR engine 141 and/or 171 to determine a plurality of speech hypotheses that conform to the predicted phoneme(s). In doing so, the ASR engine 141 and/or 171 can optionally employ a decoding graph, a lexicon, and/or other resource(s).

In various implementations, the NLU output can include, for example, annotated recognized text that includes one or more annotations of the recognized text for one or more (e.g., all) of the terms of the recognized text. For example, the NLU engine 142 and/or 172 may include a part of speech tagger (not depicted) configured to annotate terms with their grammatical roles. Additionally, or alternatively, the NLU engine 142 and/or 172 may include an entity tagger (not depicted) configured to annotate entity references in one or more segments of the recognized text, such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person, particular place or location of entity that is associated with multiple locations, etc.). The entity tagger may rely on content of user inputs to resolve a particular entity and/or may optionally communicate with a knowledge graph or other entity database to resolve a particular entity.

Additionally, or alternatively, the NLU engine 142 and/or 172 may include a coreference resolver (not depicted)

configured to group, or "cluster," references to the same entity based on one or more contextual cues. For example, the coreference resolver may be utilized to resolve the term "them" to "[entity]" in the user input "call them", based on the "[entity]" being mentioned in a client device notification rendered immediately prior to receiving input "call them" or based on the "[entity]" being associated with content currently displayed at a user interface of the client device 110. In some implementations, one or more components of the NLU engine 142 and/or 172 may rely on annotations from one or more other components of the NLU engine 142 and/or 172. For example, in some implementations the entity tagger may rely on annotations from the coreference resolver in annotating all mentions to a particular entity. Also, for example, in some implementations, the coreference resolver may rely on annotations from the entity tagger in clustering references to the same entity. Also, for example, in some implementations, the coreference resolver may rely on user data of the user of the client device 110 in coreference resolution and/or entity resolution.

In various implementations, the fulfillment output can include, for example, one or more tasks to be performed by the automated call assistant 191 and on behalf of the user of the client device 110. As described in more detail herein, the user of the client device 110 can provide various user inputs to cause the automated call assistant 191 to initiate telephone calls with various entities, and the automated call assistant 191 can optionally engage in corresponding conversations with human representatives employed by the entities, IVR systems employed by the entities, etc. to perform task(s) on behalf of the user of the client device 110. Accordingly, it should be understood that the fulfillment output may be dependent on the corresponding conversations and/or the task(s) to be performed on behalf of the user of the client device 110.

In various implementations, the TTS engine 144 and/or 174 can generate synthesized speech audio data that captures computer-generated synthesized speech. The synthesized speech audio data can be rendered at the client device 110 via speaker(s) of the client device 110 and/or rendered at additional client device(s) via respective speaker(s) of the additional client device(s) (e.g., additional client device(s) associated with entities). The synthesized speech may include, for example, synthesized speech generated as part of a dialog between the automated call assistant 191 and the representatives of the entities described herein.

In various implementations, the assistant availability determination engine 150 can determine whether the automated call assistant 191 is able to automate telephone call(s) on behalf of the user of the client device 110 and with a given entity. The assistant availability determine engine 150 can determine that the automated call assistant 191 is able to automate a telephone call on behalf of the user of the client device 110 and with the given entity based on, for example, whether the given entity belongs to a type of entity for which the automated call assistant 191 is trained to automate telephone calls with, whether the client device 110 and/or the server 160 are capable of automating the telephone call at a given instance of time (e.g., have available bandwidth and/or computational resources the automate the telephone call), and/or based on other suitable criteria.

In various implementations, and in response to determining that the automated call assistant 191 is able to automate a telephone call on behalf of the user of the client device 110 and with the given entity, an automated telephone call suggestion element generation engine 145 and/or 175 (simply referred to herein as "autocall suggestion generation engine 145 and/or 175") can generate an automated telephone call suggestion element, and cause the automated telephone call suggestion element to be visually rendered via the user interface of the client device 110. The automated telephone call suggestion element generated by the autocall suggestion generation engine 145 and/or 175 can be selectable, and when selected, causes the automated call assistant to be activated and an interface of the automated call assistant to be visually rendered to display one or more graphical user interface elements (e.g., one or more selectable elements each recommending a respective task to be performed during the telephone call, and/or an input field to receive user input that describes a task to be performed during the telephone call). Notably, the automated telephone call suggestion element can be visually rendered subsequent to the user of the client device 110 providing user input to initiate a telephone call, but prior to the telephone actually being initiated. Put another way, the automated telephone call suggestion element call can be visually rendered by the automated call assistant 191 to indicate that the automated call assistant 191 can automate a telephone call on behalf of the user of the client device 110 that the user of the client device 110 is about to manually initiate and conduct.

In various implementations, and in response to receiving a user selection of the automated telephone call suggestion element, an entity identification engine 146 and/or 176 can identify an entity to be engaged with during the telephone call. In some versions of those implementations, the entity identification engine 146 and/or 176 can further identify a telephone number that is associated with the entity to be engaged with during the telephone call. For example, the entity identification engine 146 and/or 176 can identify the entity and/or the telephone number that is associated with the entity based on an electronic message (e.g., an email, a text message, a social media message, a voicemail message, and/or any other electronic messages) that identifies the entity and/or the telephone number associated with the entity that was selected to initiate the telephone call. As another example, the entity identification engine 146 and/or 176 can identify the entity and/or the telephone number that is associated with the entity based on content included in an user interface that is actively displayed at the client device 110 (e.g., a search engine results page, a maps/navigation page, text message, a social media message, and/or any other electronic messages) that identifies the entity and/or the telephone number associated with the entity that was selected to initiate the telephone call.

In various implementations, and in response to receiving a user selection of the automated telephone call suggestion element, a task suggestion element generation engine 147 and/or 177 can generate one or more task suggestion elements, and cause the one or more task suggestion elements to be visually rendered via the user interface of the client device 110. The one or more task suggestion elements generated by the task suggestion element generation engine 147 and/or 177 can each be selectable and, when selected, cause a corresponding task, of the identified one or more tasks, to be determined as the task to be performed by the automated call assistant 191 during the telephone call on behalf of the user.

In some versions of those implementations, the one or more task suggestion elements generated by the task suggestion element generation engine 147 and/or 177 can each be generated based on, for example, tasks that are stored in association with the type of entity of the given entity to be engaged with during the telephone call (e.g., in the data storage 130). For example, if the entity is a delivery service type of entity, then the one or more tasks can include a delivery status update task, a cancel delivery task, and/or other tasks associated with the delivery service type of entity as the one or more tasks. Also, for example, if the entity is a restaurant type of entity, then the one or more tasks can include a restaurant reservation task, a reservation confirmation task, and/or other tasks associated with the restaurant type of entity. In additional or alternative implementations, the one or more task suggestion elements generated by the task suggestion element generation engine 147 and/or 177 can each be generated based on, for example, one or more prior interactions by the user with respect to the entity. For example, in generating the one or more task suggestion elements, the task suggestion element generation engine 147 and/or 177 can consider a prior electronic communication received from the entity, a prior telephone call with the entity, a search result associated with the entity, etc. Accordingly, not only do the one or more task suggestion elements include task suggestions that are typically associated with the type of entity of the given entity to be engaged with during the telephone call, but the one or more task suggestion elements can also be tailored to the prior interactions between the user and the given entity to be engaged with during the telephone call.

In some additional or alternative versions of those implementations, and in response to receiving a user selection of the automated telephone call suggestion element, the automated call assistant 191 can cause the rendering engine 190 to visually render a natural language input field to receive natural user input that describes the task to be performed during the telephone call. This enables the user of the client to provide the task to be performed during the telephone call via spoken input, typed input, and/or other types of input directed to the natural language input field. In some versions of those implementations, any natural language input provided by the user can be analyzed to determine whether the natural language input includes sufficient information to perform the task, whether the natural language input includes answers to questions typically posed by the entity, and/or otherwise analyzed to ensure that the automated call assistant 191 has sufficient information and context to perform the task on behalf of the user during the telephone call with the entity.

In various implementations, and in response to receiving a user selection of a given task suggestion element from among the one or more task suggestion elements and/or in response to receiving natural language input directed to the natural language input field, a task determination engine 148 and/or 178 can determine the task to be performed during the telephone call with the entity and on behalf of the user. The task determination engine 148 and/or 178 can determine the task to be performed during the telephone call based on user selection of a particular task suggestion element from the one or more task suggestion elements displayed via the client device 110. Alternatively, the task determination engine 148 and/or 178 can determine the task to be performed during the telephone call based on the natural language input provided by the user. In some implementations, the task determination engine 148 can determine, based on the particular task, textual data that includes one or more textual sentences to be utilized in performing the task. The textual data determined by the task determination engine 148 can be processed (e.g., using the TTS engine 144 and/or 174) to generate one or more instances of synthesized speech audio data capturing synthesized speech of the automated call assistant 191, to interact with a representative of the entity during the telephone call.

Although particular engines and sub-engines are depicted in FIG. 1, it should be understood that is for the sake of example and is not meant to be limiting. For example, one or more of the engine and/or sub-engines depicted in FIG. 1 can be combined and/or omitted. Further, it should be noted that the telephone calls described herein can be automated by the automated call assistant 191 executing locally at the client device 110 (e.g., via the on-device automated call assistant 140) and/or remotely from the client device 110 (e.g., via the cloud-based automated call assistant 170). In implementations where the automated call assistant 191 is executed locally at the client device 110 (e.g., via the on-device automated call assistant 140), network resources can be conserved since data need not be transmitted between the client device 110 and the server 160 and over the one or more networks 180. However, in implementations where the automated call assistant 191 is executed remotely from the client device 110 (e.g., via the cloud-based automated call assistant 170), computational resources can be conserved at the client device 110. Additional detail with respect to the engines and sub-engines are depicted in FIG. 1 is provided herein (e.g., with respect to FIGS. 2A-2E, 3A-3D, 4A, and 4B).

Figure 2A:
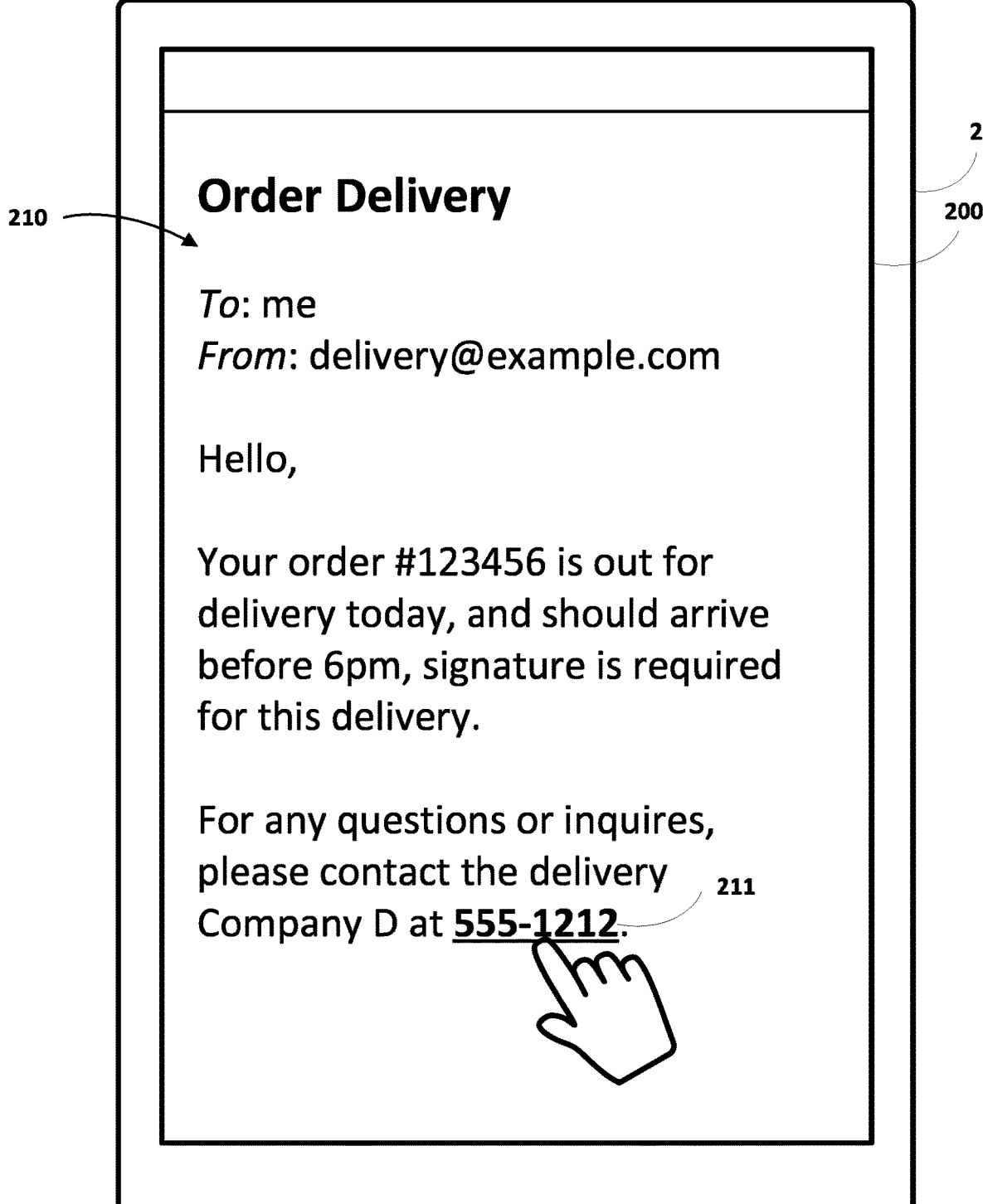
FIGS. 2A, 2B, 2C, 2D, and 2E depict various non-limiting examples of an automated call assistant automating a telephone call on behalf of a user, in accordance with various implementations.
Figure 2B:
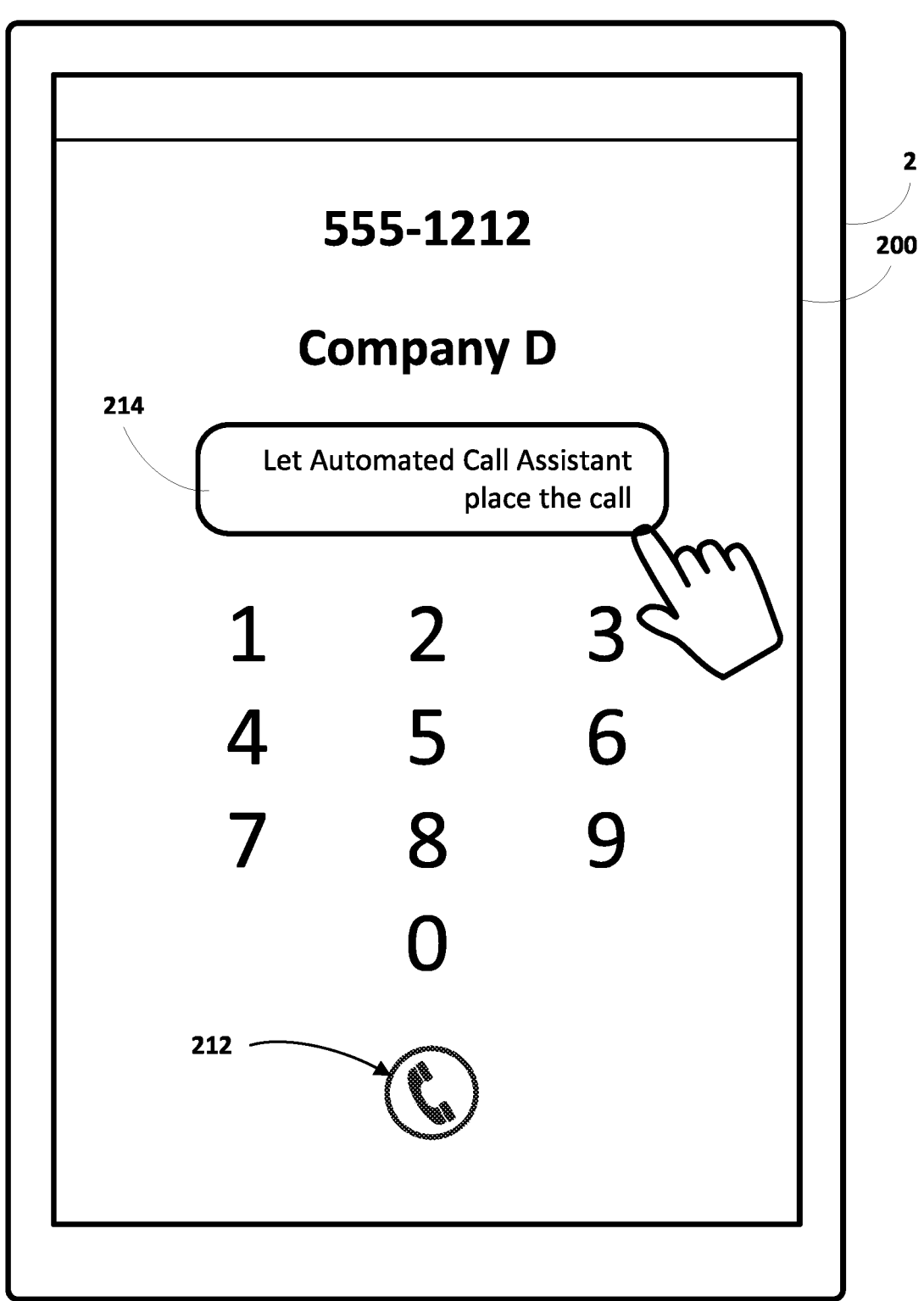

Turning now to FIGS. 2A, 2B, 2C, 2D, and 2E, various non-limiting examples of an automated call assistant automating a telephone call on behalf of a user are depicted. For the sake of example, assume that a user of a client device 2 (e.g., an instance of the client device 110 from FIG. 1) is expecting a delivery. Referring specifically to FIG. 2A, further assume that the user receives an email 210 from "Company D" (e.g., a delivery service entity that delivers the user's order) and reviews the email 210 via a user interface 200 of the client device 2 that is displaying an email software application. Further assume that the email 210 is titled "Order delivery" and has a message body of "Hello, your order #123456 is out for delivery today, and should arrive before 6 pm, signature is required for this delivery. For any questions or inquiries, please contact the delivery company D at 555-1212" that informs the user of the upcoming delivery. Notably, in this example, the email 210 includes a contact telephone number 211 of "Company D" that is selectable and, when selected, causes the user interface 200 of the client device 2 to launch a telephone software application as shown in FIG. 2B.

In some implementations, the user of the client device 2 can initiate the telephone call with "Company D" manually by selecting a "call" selectable element 212. However, in other implementations, and assuming that an automated call assistant (e.g., an instance of the automated call assistant 191 from FIG. 1) is able to automate the telephone call on behalf of the user of the client device, an automated telephone call suggestion element 214 can be visually rendered at the user interface 200 of the client device 2. The automated telephone call suggestion element 214 can be selectable and can suggest an automated call service to the user (e.g., by displaying natural language content such as "Let Automated Call Assistant place the call" or the like). Accordingly, rather than the user of the client device 2 manually conducting the telephone call, the automated call assistant can inform the user that it can automate the call on behalf of the user. In this example, further assume that a user selection of the automated telephone call interface element 214 is received as shown by the hand in FIG. 2B.

Figure 2C:
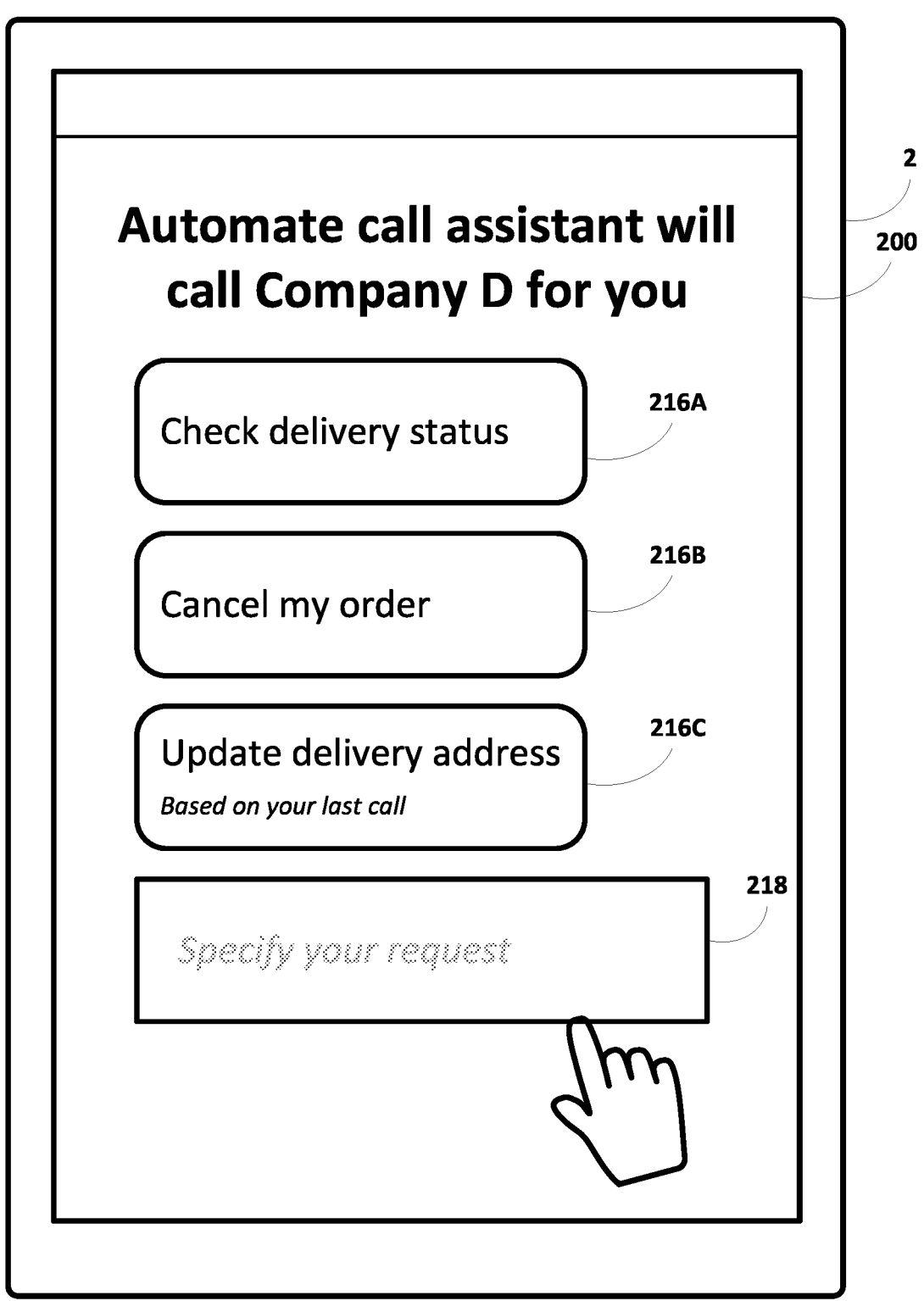

In some implementations, and in response to receiving the user selection of the automated telephone call suggestion element 214, the automated call assistant can cause one or more task suggestion elements (e.g., 216A, 216B, and 216C)

to be visually rendered for presentation to the user as shown in FIG. 2C. Each of the one or more task suggestion elements can be associated with a respective task that is to be performed by the automated call assistant during the telephone call.

In some versions of those implementations, the one or more task suggestion elements can include tasks that are associated with a type of entity that corresponds to the entity with which the automated call assistant is to engage with during the telephone call. For instance, and as shown in FIG. 2C, the one or more task suggestion elements can include a first task suggestion element 216A that is associated with a first task of "check delivery status" for the order number indicated in the email 210 from FIG. 2A and a second task suggestion element 216B that is associated with a second task of "cancel my order" for the order number indicated in the email 210 from FIG. 2A. Notably, these are typical tasks that are associated with delivery services and are not tailored to the user of the client device 2.

In additional or alternative versions of those implementations, the one or more task suggestion elements can include tasks that are determined based on prior interactions with the entity. For instance, assume that the user of the client device 2 recently moved, and has recently contacted "Company D" to change a delivery address for other deliveries. Accordingly, and as shown in FIG. 2C, the one or more task suggestion elements can additionally, or alternatively, include a third task suggestion element 216C that is associated with a third task of "update delivery address". Notably, and in contrast with the first task suggestion element 216A and the second task suggestion element 216B, the third task suggestion element 216C is tailored to the user of the client device 2 based on the user previously calling "Company D" to update the delivery address.

Figure 2D:
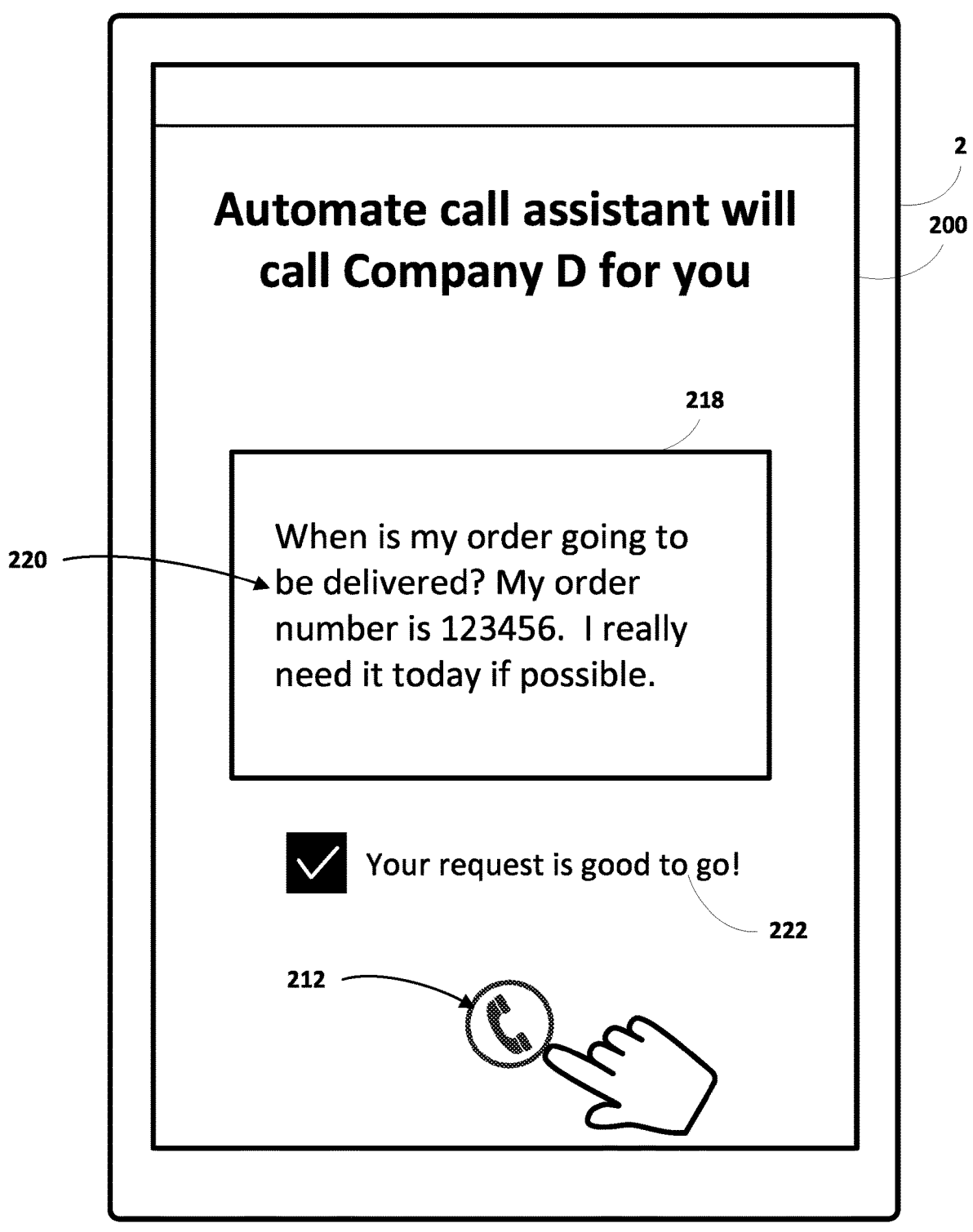

In additional or alternative implementations, and in response to receiving the user selection of the automated telephone call suggestion element 214, the automated call assistant can cause a natural language input field 218 to be visually rendered for presentation to the user as shown in FIG. 2C. The natural language input field 218 enables the user of the client device 2 to provide a natural language description of the task to be performed by the automated call assistant during the telephone call in instances where the user would like to provide additional detail beyond what is reflected by the one or more task suggestion elements and/or in instances where the task the user would the automated call assistant to perform is not included in the one or more task suggestion elements. Notably, the natural language description of the task to be performed by the automated call assistant during the telephone call can be provided through voice input, touch input, or a combination thereof. In this example, further assume that a user selection of the natural language input field 218 is received as shown by the hand in FIG. 2C. Further assume that the user of the client device 2 provides a natural language description 220 as shown in FIG. 2D that includes "When is my order going to be delivered? My order number is 123456. I really need it today if possible."

In some implementations, the automated call assistant can determine whether the natural language description 220 is sufficient to enable the automated call assistant to perform the task. For example, the automated call assistant can compare content included in the natural language description 220 to content that is typically requested by the type of entity of the given entity and for the task to be performed, such as slot values for parameters that are typically requested by the type of entity of the given entity and that can vary for the task to be performed. For instance, and assuming that the entity is a delivery service type entity as "Company D", the automated call assistant can analyze the natural language description 220 to determine whether the natural language description 220 includes an order number (e.g., "123456") that is a slot value for an order number parameter. Accordingly, in the example of FIG. 2D, the user can direct user input to the "call" selectable element 212 to cause the automated call assistant to initiate and conduct the telephone call in an automated manner and on behalf of the user to inquire about the delivery status as indicated by the natural language description 220 since the automated call assistant indicated at 222 that the natural language description 220 is sufficient to enable the automated call assistant to perform the task as indicated by 222.

Figure 2E:
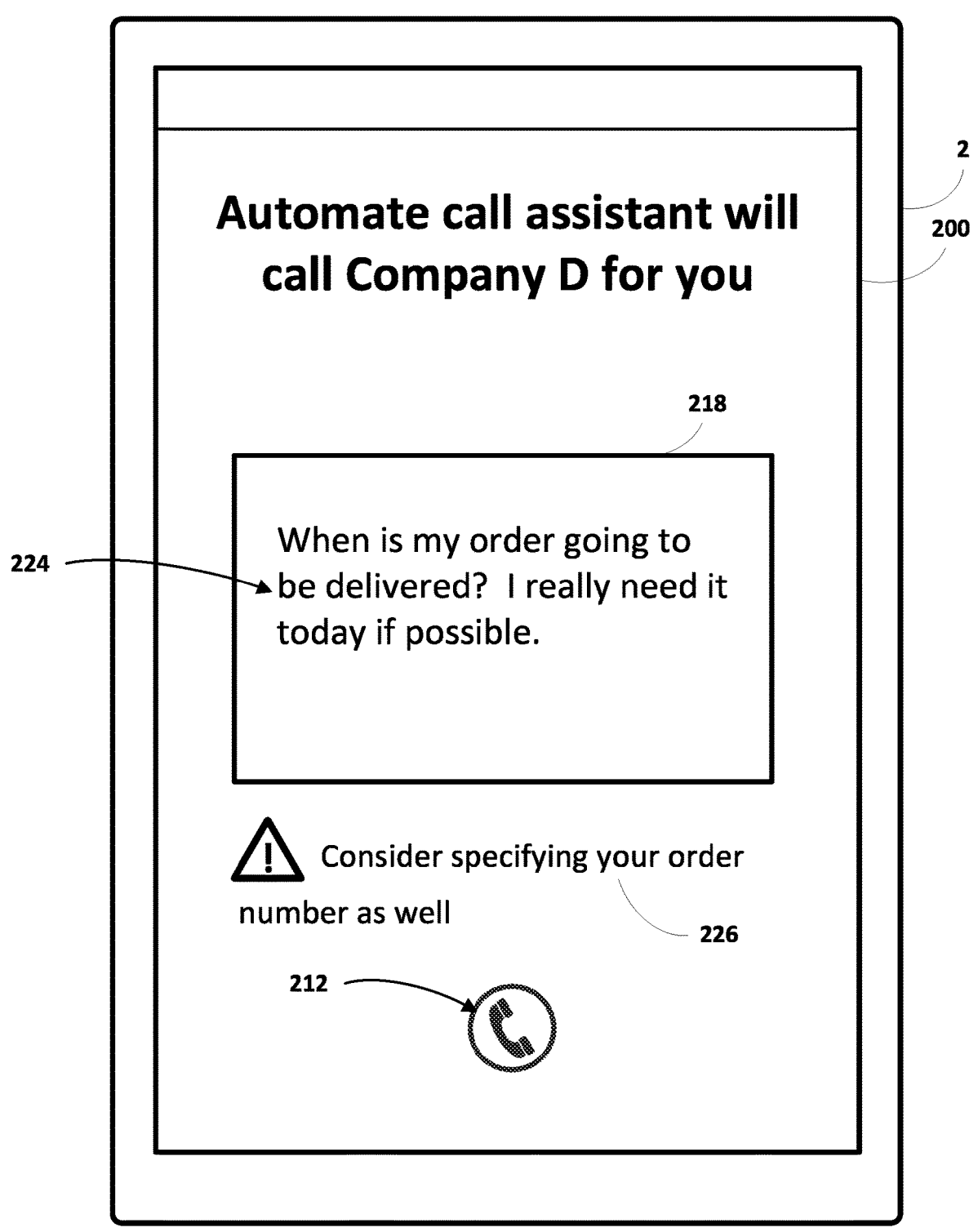

In contrast, assume that the user of the client device 2 provides a natural language description 224 as shown in FIG. 2E that omits the order number. Accordingly, in the example of FIG. 2E, the automated call assistant can indicate at 226 that the user should consider specifying the order number (e.g., "123456") that is the slot value for the order number parameter since delivery service type of entities typically request this information when users call to inquire about a delivery update of an order. This enables the user to revise the natural language description 224 prior to directing user input to the "call" selectable element 212 to cause the automated call assistant to initiate and conduct the telephone call in an automated manner and on behalf of the user to inquire about the delivery status. However, it should be understood that the automated call assistant can obtain the order number from other sources in various examples (e.g., from the email in FIG. 2A), thereby obviating the need for the user to specify certain information, such as the order number. As a result, the automated call assistant can effectively perform the task of inquiring about the delivery status and without having to request the order number (e.g., "123456") that is the slot value for the order number parameter during the telephone call. By analyzing the content of the natural language description 220 and/or 224 to ensure that is sufficient to perform the task, the automated call assistant can conclude the telephone call in a more quick and efficient once it is initiated, thereby reducing telephone network traffic had the automated call assistant needed to prompt the user for the order number during the telephone call and/or had the user manually conducted the telephone call and needed to look-up the order number during the telephone call.

Although not depicted for the sake of brevity, in initiating and conducting the telephone call on behalf of the user, the automated call assistant can utilize the phone number for "Company D" (e.g., "555-1212") to initiate the telephone call. Further, in conducting the telephone call, the automated call assistant can generate and audibly render corresponding instances of synthesized speech audio data at a client device of a representative for "Company D". Further, the representative for "Company D" can provide spoken utterances captured in audio data. This enables the automated call assistant to generate and visually render a transcription of the telephone call such that the user can monitor the telephone call. In some implementations, the client device 2 can, during the telephone call, visually render a call participation suggestion element that, when selected by the user of the client device 2, enables the user to join the telephone call. In some implementations, the automated call assistant can generate and render a summary of the telephone call upon completion of the telephone call to notify the user of a result of performance of the task during the telephone call.

Further, although FIGS. 2A-2E are described with respect to the entity being a delivery service type of entity and the task being inquiring for a delivery status update, it should be understood that is for the sake of example to illustrate techniques described herein and is not meant to be limiting. Rather, it should be understood that the entity can be of any type for which the automated call assistant is able to automate telephone calls with, and the task to be performed during the telephone call can include any task for which the automated call assistant is able to perform during the telephone call.

Moreover, although FIGS. 2A-2E are described with respect to the user input being directed to the email 210 in FIG. 2A as an entry point for the automated call assistant, it should be understood that is also for the sake of example to illustrate techniques described herein and is not meant to be limiting. For example, the entry point can include any input to initiate a telephone call from various software applications including, but not limited to, a search engine results page via a browser software application, a maps/navigation results page via a maps/navigation software application, an in-vehicle software application, a text message via a text messaging software application, a social media message via a social media software application, an automated call assistant software application, and/or any other entry point through which telephone calls can be initiated.

Figure 3A:
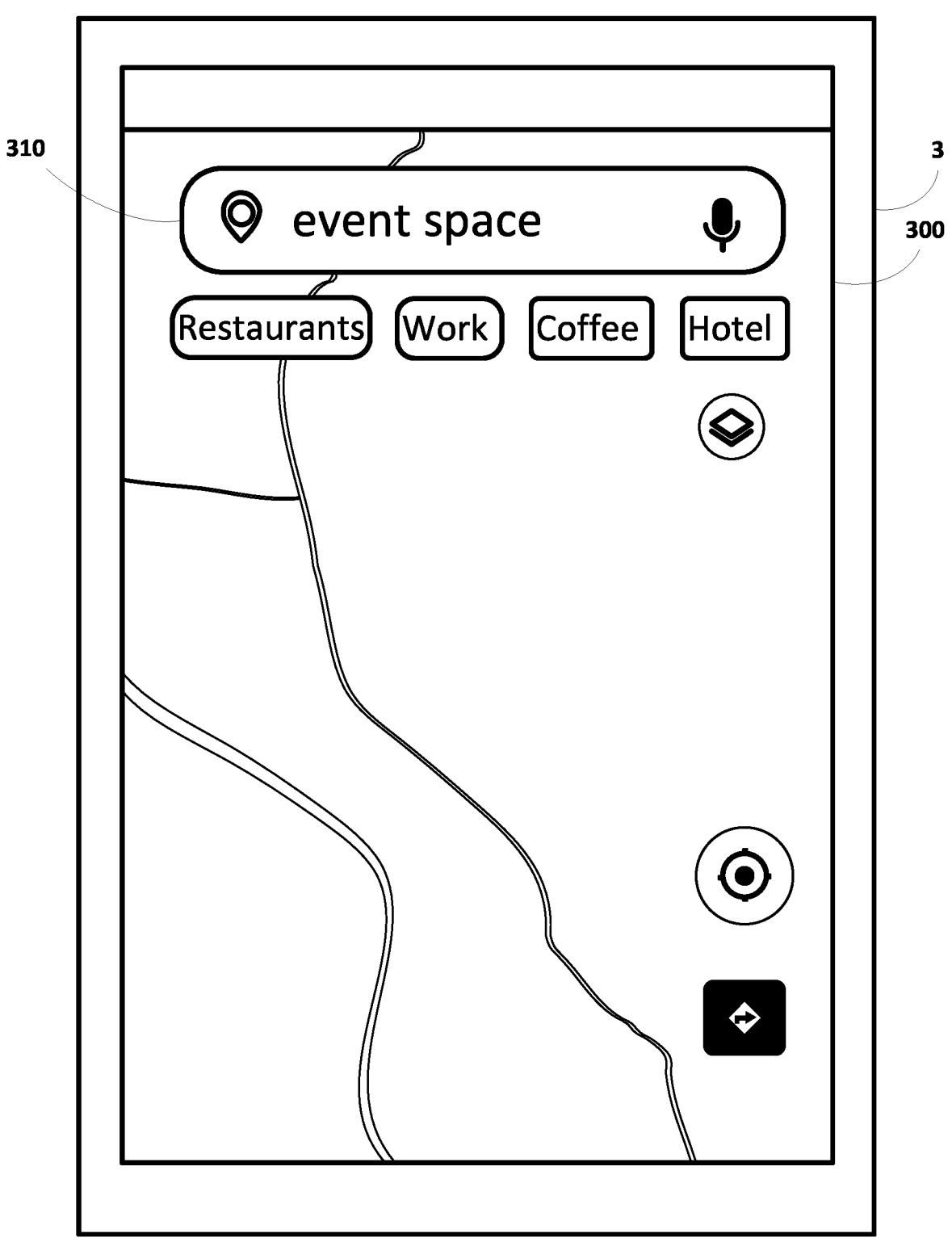
FIGS. 3A, 3B, 3C, and 3D depict various additional non-limiting examples of an automated call assistant automating a telephone call on behalf of a user, in accordance with various implementations.
Figure 3B:
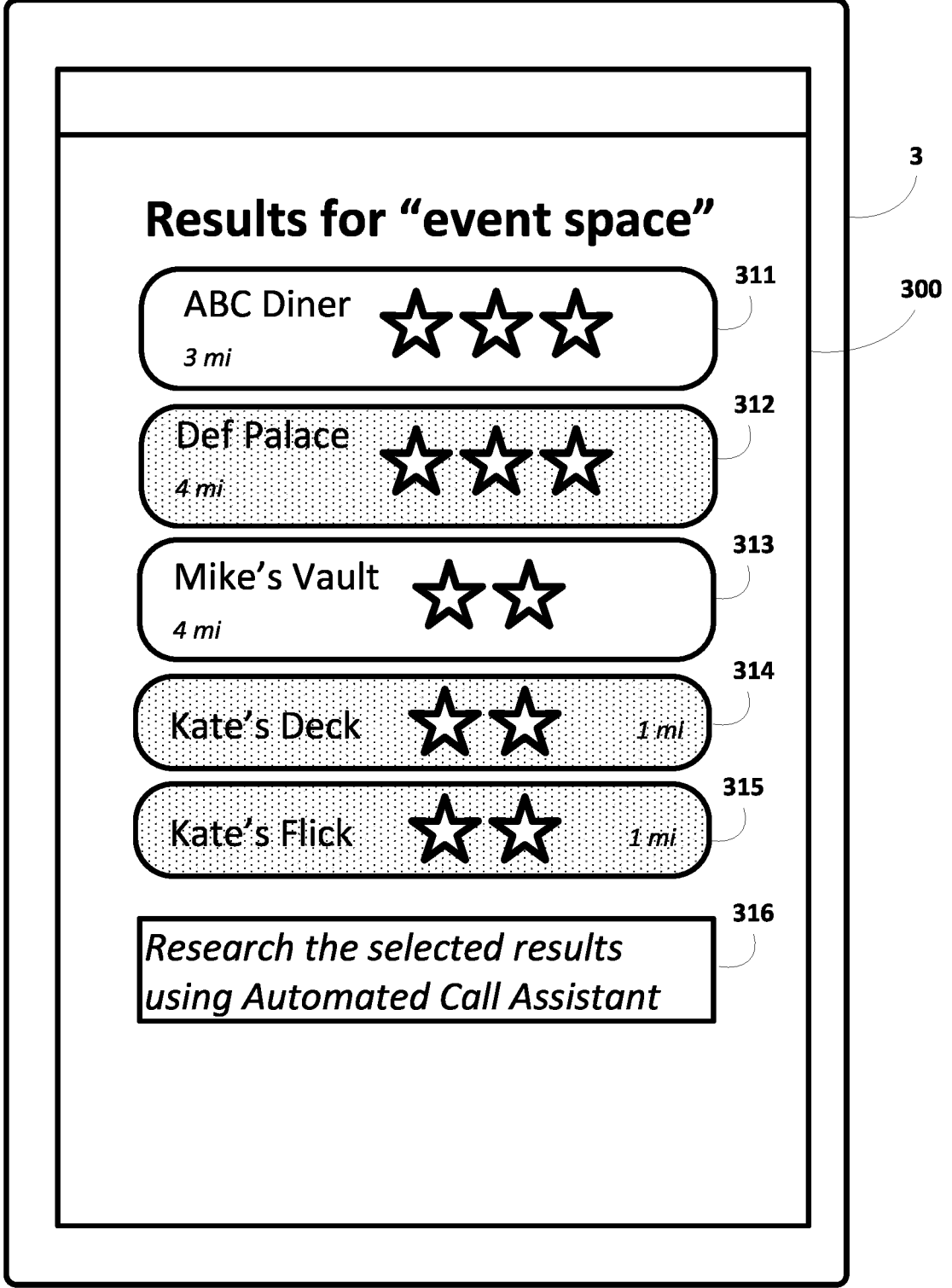

Turning now to FIGS. 3A, 3B, 3C, and 3D, various additional non-limiting examples of an automated call assistant automating a telephone call on behalf of a user are depicted. For the sake of example, assume that a user of a client device 3 (e.g., an instance of the client device 110 from FIG. 1) is booking an event. Referring specifically to FIG. 3A, further assume that the user of the client device 3 is using a maps/navigation software application that is displayed at a user interface 300 of the client device 3, and provides a query of "event space" at a search field 310 via the user interface 300 of the client device 3. As shown in FIG. 3B, further assume that the user of the client device 3 is presented with a list of search results 311, 312, 313, 314, and 315 that are responsive to the query of "event space". Notably, each of the search results included in the list of search results 311, 312, 313, 314, and 315 correspond to a plurality of event space entities. For instance, the list of search results 311, 312, 313, 314, and 315 depicted in FIG. 3B includes search results associated with a first entity 311 ("ABC Diner" with a 3-star rating that is approximately 3 miles away), a second entity 312 ("Def Palace" with a 3-star rating that is approximately 4 miles away), a third entity 313 ("Mike's Vault" with a 2-star rating that is approximately 4 miles away), a fourth entity 314 ("Kate's Deck" with a 2-star rating that is approximately 1 mile), and a fifth entity 315 ("Kate's Flick" with a 2-star rating that is approximately 1 mile away).

Further assume that, in booking the event, the user is considering the second entity 312, the fourth entity 314, and the fifth entity 315, and selects the corresponding search results associated with these entities (e.g., as indicated by these search results being grayed out). In response to receiving the user selection of the search results associated with the second entity 312, the fourth entity 314, and the fifth entity 315, an automated call assistant (e.g., an instance of the automated call assistant 191 from FIG. 1) can cause an automated telephone call suggestion element 316 to be visually rendered for presentation to the user. The automated telephone call suggestion element 316, when selected, enables the user of the client device 3 to leverage the automated call assistant to inquire each of the selected entities about the event to be booked and on behalf of the user. However, the automated call assistant needs more details about the event to adequately inquire each of the selected entities about the event to be booked.

Figure 3C:
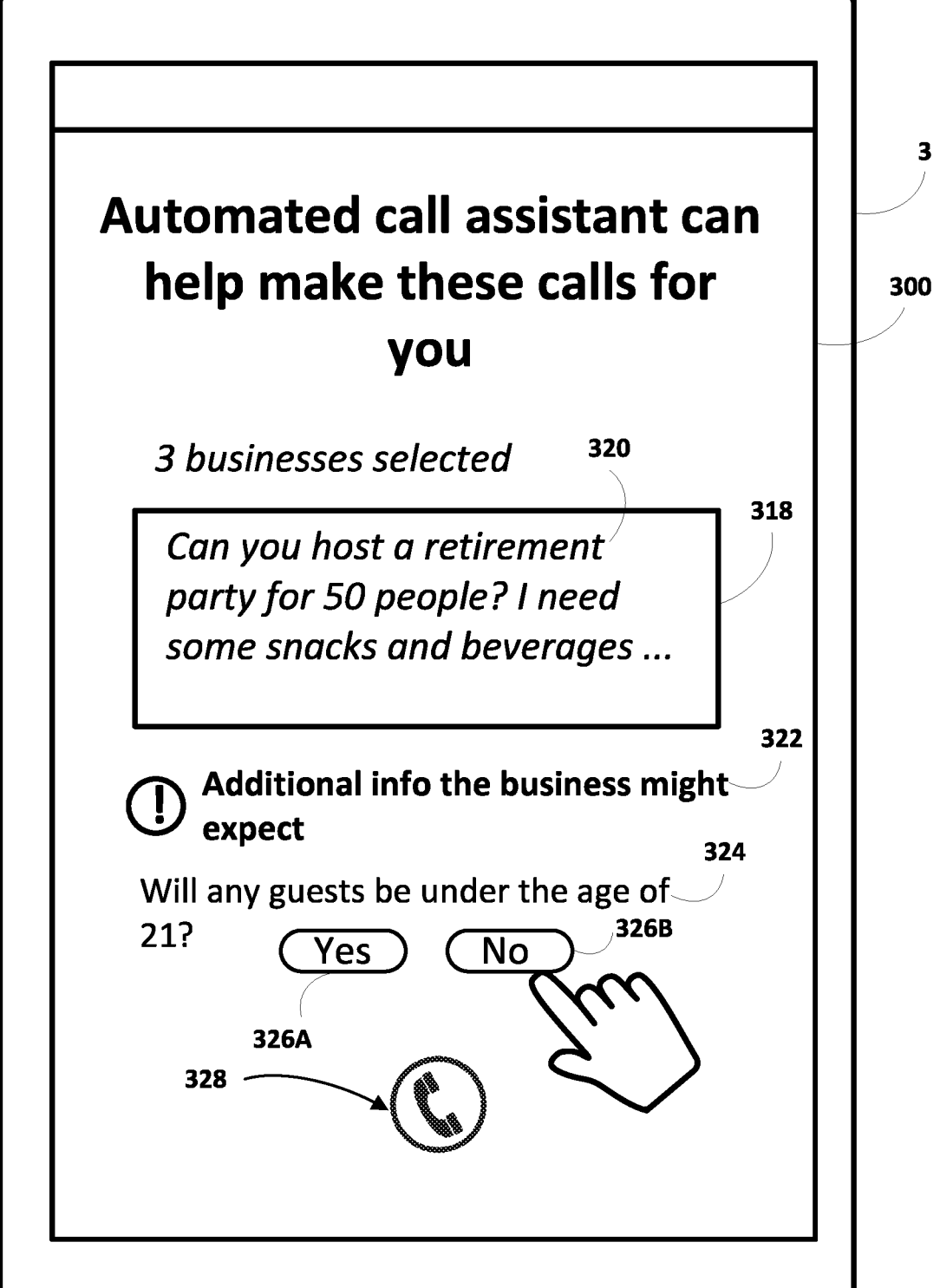

Accordingly, and as shown in FIG. 3C, a natural language input field 318 can be visually rendered at the user interface 300 of the client device 3 to enable the user of the client device 3 to provide a natural language description 320 of the event. For instance, assume that the user provides the natural language description 320 of "Can you host a retirement party for 50 people? I need some snacks and beverages . . . ". However, and similar to the description of FIGS. 2D and 2E above, the automated call assistant can analyze the natural language description 320 to determine whether it is sufficient to perform the task during the telephone call as indicated by 322. For instance, in the example of FIG. 3C, the automated call assistant can include a prompt 324 of whether there will be any guests at the retirement party that are under the age of 21, and can optionally include selectable elements with anticipated responses to the prompt 324, such as a "yes" selectable element 326A and a "no" selectable element 326B. Further assume that the user selects the "no" selectable element 326B, and directs further user input to a "call" selectable element 328 to initiate corresponding telephone calls with each of the second entity 312, the fourth entity 314, and the fifth entity 315 to inquire each of the selected entities about the event to be booked and on behalf of the user.

In various implementations, the automated call assistant can analyze the natural language description 320 to determine whether the task to be performed is suitable for performance by the automated call assistant. For example, the automated call assistant can analyze the natural language description 320 using various machine learning models (e.g., large language models (LLMs)) to determine whether it is safe, feasible, or phrased appropriately. In implementations where the automated call assistant determines that the task is not safe or feasible (e.g., the natural language description includes a threat to person or property), then the automated call assistant can refrain from initiating and conducting the telephone call on behalf of the user. In implementations where the automated call assistant determines that the task is not phrased optimally, the automated call assistant can leverage these various machine learning models to automatically rewrite the natural language description 320 or provide additional or alternative suggestions to the natural language description 320. For instance, if the natural language description 320 includes ramblings without actually identifying any task, then the automated call assistant can suggest tasks for the user to include in the natural language description 320. Also, for instance, if the natural language description includes run-on sentences and is disorganized, then the automated call assistant can automatically rewrite the natural language description to be more coherent and logically organized through use of these various machine learning models.

Figure 3D:
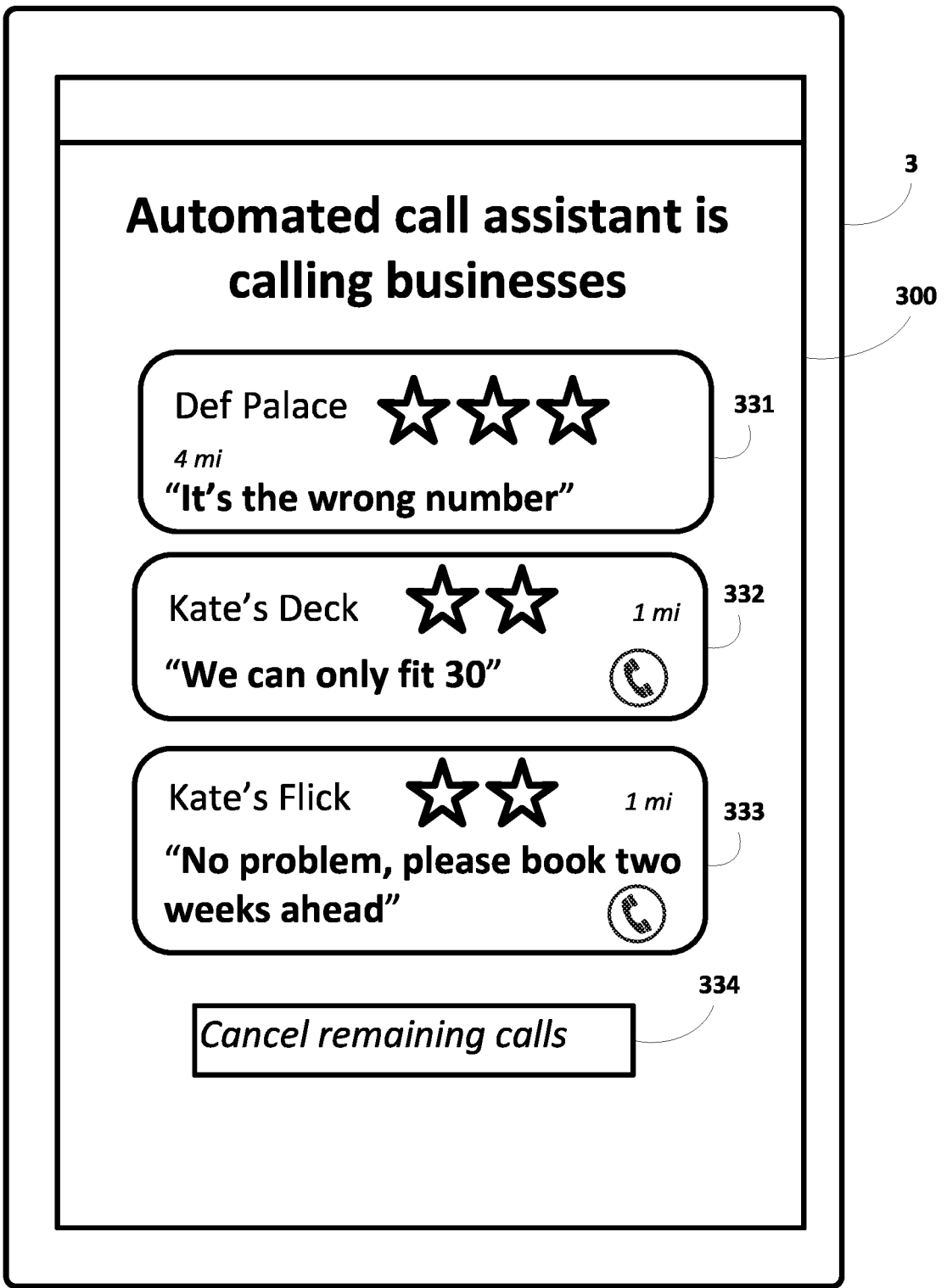

Referring specifically to FIG. 3D, the automated call assistant can initiate and conduct the corresponding telephone calls with each of the second entity 312, the fourth entity 314, and the fifth entity 315 as described herein, and provide a summary of each of the corresponding telephone calls. For instance, a first summary 331 that is associated with the second entity 312 can indicate that the telephone number called for the second entity 312 was a wrong telephone number, a second summary 332 associated with the fourth entity 314 can indicate that the fourth entity 314 cannot accommodate the retirement since there will be 50 people attending the fourth entity 314 can only accommodate 30 people, and a third summary 333 associated with the fifth entity 315 can indicate that the fifth entity 315 can accommodate the retirement party but that it needs to be booked two weeks in advance. Accordingly, rather than the user of the client device 3 having to call these entities to inquire about the event to be booked, the automated call assistant can handle it on behalf of the user.

In various implementations, the corresponding telephone calls with each of the second entity 312, the fourth entity 314, and the fifth entity 315 can be conducted in a parallel manner, such that the automated call assistant interacts with corresponding representatives of each of the entities at the same time. This enables the automated call assistant to complete all of the corresponding telephone calls in a quick and efficient manner. However, in other implementations, the automated call assistant can conduct the corresponding automated telephone calls in a parallel manner. This can reduce computational and/or network resources and reduce telephone network traffic since the user can cancel any remaining telephone calls if a given entity is capable of hosting the retirement party as indicated by 334.

Although not depicted for the sake of brevity, in initiating and conducting the corresponding telephone call on behalf of the user, the automated call assistant can utilize corresponding phone numbers for each of the entities to initiate the corresponding telephone calls. Further, in conducting the corresponding telephone call, the automated call assistant can generate and audibly render corresponding instances of synthesized speech audio data at a client device of respective representative for each of the entities. Further, the respective representatives for each of the entities can provide corresponding spoken utterances captured in corresponding audio data. This enables the automated call assistant to generate and visually render a corresponding transcription of each of the corresponding telephone calls such that the user can monitor one or more of the corresponding telephone calls such that the user can toggle between the corresponding transcriptions. In some implementations, the client device 3 can, during the corresponding telephone calls, visually render a corresponding call participation suggestion element that, when selected by the user of the client device 3, enables the user to join a given one of the corresponding telephone calls.

Further, although FIGS. 3A-3D are described with respect to the automated call assistant being able to automate the corresponding telephone calls with each of the entities selected by the user, it should be understood that is for the sake of example. For example, in some instances, the automated call assistant may only be able to automate corresponding telephone calls with a subset of the entities selected by the user. In these instances, the automated call assistant can automate the corresponding telephone calls that it is able to automate, but the user can manually initiate and conduct the corresponding telephone calls with the other entities.

Figure 4A:
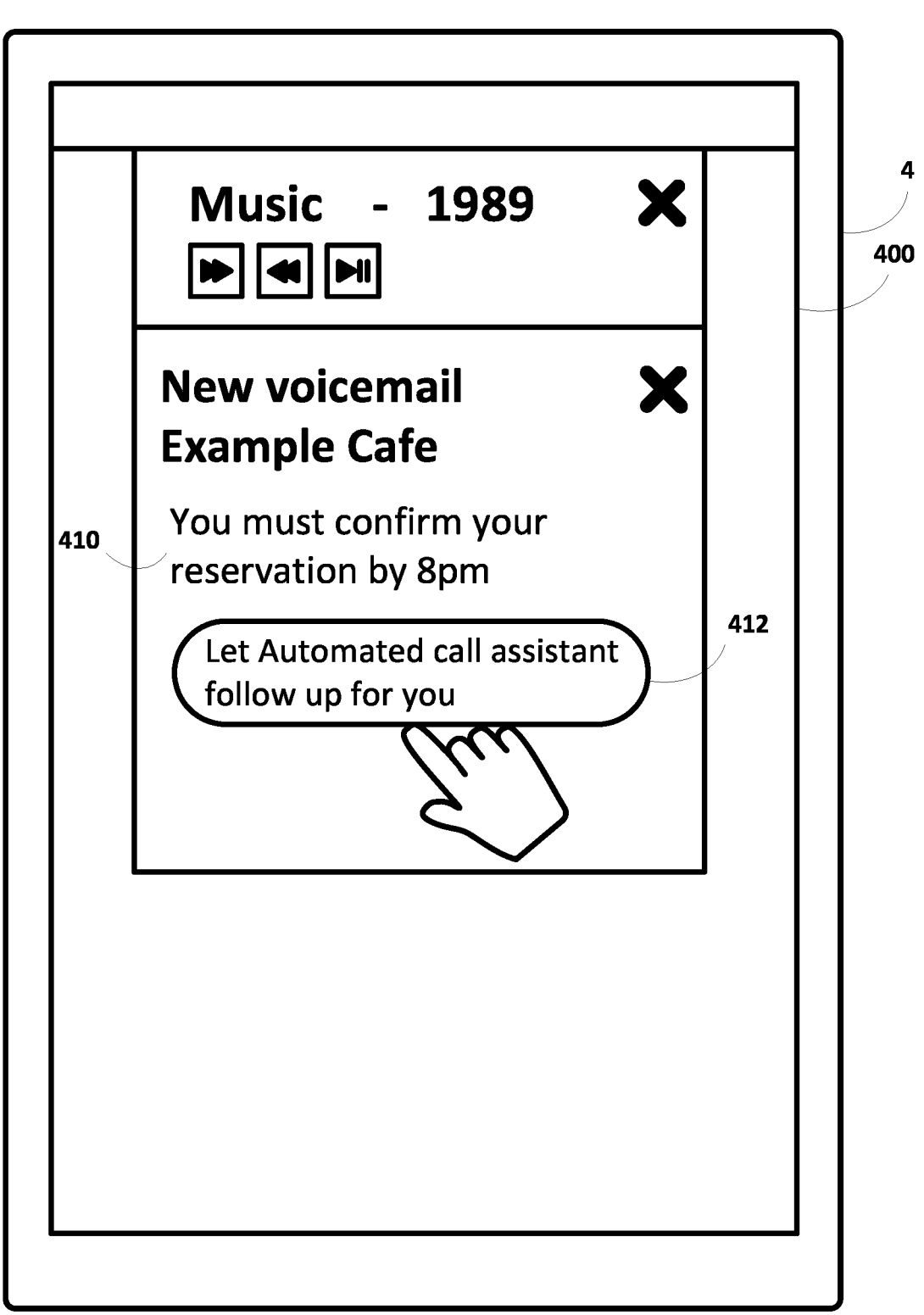
FIGS. 4A and 4B depict various additional non-limiting examples of an automated call assistant automating a telephone call on behalf of a user, in accordance with various implementations.
Figure 4B:
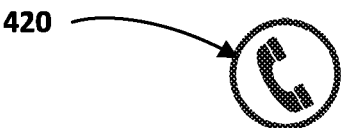

Turning now to FIGS. 4A and 4B, various additional non-limiting examples of an automated call assistant automating a telephone call on behalf of a user are depicted. For the sake of example, assume that a user of a client device 4 (e.g., an instance of the client device 110 from FIG. 1) has an upcoming reservation at a restaurant named Example Café. Referring specifically to FIG. 4A, further assume that the user ignores a telephone call from Example Café and that a representative of Example Café leaves the user a voicemail message requesting that the user confirm the upcoming reservation as indicated by 410. Further assume that an automated call assistant (e.g., an instance of the automated call assistant 191 from FIG. 1) determines that is able to automated a return telephone call to Example Café on behalf of the user to confirm the upcoming reservation. Accordingly, the automated call assistant can cause an automated telephone call suggestion element 412 to be visually rendered for presentation to the user at a user interface 400 of the client device 4. In this example, further assume that a user selection of the automated telephone call interface element 412 is received as shown by the hand in FIG. 4A.

Referring to FIG. 4B, the automated call assistant can cause a transcript 414 of the voicemail message to be visually rendered for presentation to the user via the user interface 400 along with a natural language input field 416 that enables the user of the client device 4 to provide a natural language description 418 of the task to be performed during the return telephone call. Accordingly, the user can provide the natural language description 418 that they want to confirm the reservation and direct user input to a "call" selectable element to cause the automated call assistant to automate the return telephone call and perform the task of confirming the reservation with Example Café.

Although FIGS. 4A and 4B are described with respect to the user providing the natural language description 418 of the task to be performed during the return telephone call, it should be understood that is for the sake of example and is not meant to be limiting. For instance, the automated call assistant can analyze the transcript 414 of the voicemail and provide a "yes" selectable element that, when selected, causes the automated call assistant to automate the return telephone call to confirm the upcoming reservation and/or provide a "no" selectable element that, when selected, causes the automated call assistant to automate the return telephone call to cancel the upcoming reservation.

Further, although FIGS. 4A and 4B are described with respect to the automated call assistant visually rendering the automated telephone call selectable element 412 in response to receiving the voicemail message from Example Café, it should be understood that is for the sake of example and is not meant to be limiting. For example, the automated call assistant can additionally, or alternatively, visually render the automated telephone call selectable element 412 for presentation to the user in response to receiving a text message, email, or other electronic message from Example Café that requests the user call to confirm the upcoming reservation.

Turning now to FIG. 5, an example method 500 of an automated call assistant automating a telephone call on behalf of a user is depicted. For convenience, the operations of the method 500 are described with reference to a system that performs the operations. This system of the method 500 includes one or more processors and/or other component(s) of computing device(s) (e.g., the on-device automated call assistant 140 of FIG. 1, the cloud-based automated call assistant 170 of FIG. 1, computing device 800 of FIG. 8, and/or other computing device(s)). Moreover, while operations of the method 500 are shown in a particular order, this is not meant to be limiting. One or more operations may be reordered, omitted, and/or added.

At block 501, the system receives, via a client device and from a user of the client device, user input to initiate a telephone call. In some implementations, the user input can be, or can include, a telephone number of an entity to which the telephone call is directed that is received via a telephone software application. In some implementations, the user input can be, or can include, selection of a contact entry associated with the entity to which the telephone call is directed via a contacts software application. In some implementations, the user input can be, or can include, a selection of graphical user interface (GUI) element (e.g., a "call" button) that, when selected, initiates the telephone call via a browser software application, a maps/navigation software application, an in-vehicle software application, and/or other software applications.

At block 503, the system can identify, based on the user input, an entity to engage with during the telephone call. For example, and referring back to FIG. 2A, the user input can include user selection of a phone number "555-1212" that is displayed at the user interface 200 and is associated with "Company D". As another example, and referring back to FIG. 3B, the user input can additionally or alternatively include user selection of multiple entities displayed at the user interface 300, where each of the multiple entities are associated with a search results page for "event space". As yet another example, and referring back to FIG. 4A, the user input can additionally or alternatively include user selection of an automated telephone call suggestion element 412 displayed at the user interface 400, where the automated telephone call suggestion element 412 is associated with automating a return telephone call to "Example Café" based on content of the voicemail message 410.

At block 505, the system determines whether a voice assistant is able to automate the telephone call with the entity on behalf of the user. The system can determine whether the voice assistant is able to automate the telephone call with the entity on behalf of the user based on, for example, whether the entity belongs to a type of entity for which the voice assistant is trained to automate telephone calls with, whether the voice assistant has available bandwidth and/or computational resources the automate the telephone call, and/or based on other suitable criteria. If, at an iteration of block 505, the system determines that the voice assistant is not able to automate the telephone call with the entity on behalf of the user, then the system returns to block 501 and to receive additional user input to initiate an additional telephone call and perform an additional iteration of the method 500.

If, at an iteration of block 505, the system determines that the voice assistant is able to automate the telephone call with the entity on behalf of the user, then the system proceeds to block 507. At block 507, the system causes an automated telephone call suggestion element to be rendered via a user interface of the client device and prior to initiating the telephone call. The automated telephone call suggestion element can be selectable and, when selected, causes the voice assistant to automate the telephone call on behalf of the user. As a non-limiting example, the automated telephone call suggestion element can be a selectable element displaying natural language content (e.g., "Let Automated Call Assistant place the call") that recommends the user to authorize the automated call assistant to automate the telephone call on behalf of the user.

At block 509, the system determines whether a user selection of the automated telephone call suggestion element is received. The user selection can be, for example, a voice selection directed to the client device that is captured in audio data generated by microphone(s) of the client device or a touch selection directed to the automated telephone call suggestion element that is visually rendered at the user interface of the client device. If, at an iteration of block 509, the system determines that no user selection of the automated telephone call suggestion element is received, then the system returns to block 501 and to receive additional user input to initiate an additional telephone call and perform an additional iteration of the method 500. For example, the system can return to block 501 from block 509 in response to determining that the user manually initiated the telephone call or that no user selection was directed to the automated telephone call suggestion element within a threshold duration of time of it being visually rendered for presentation to the user of the client device.

If, at an iteration of block 509, the system determines that a user selection of the automated telephone call suggestion element is received, then the system proceeds to block 511. At block 511, the system determines a task to be performed on behalf of the user and during the telephone call. As described herein, the system can determine the task to be performed based on utilizing one or more task suggestion elements, receiving natural language input directed to a natural language input field, analyzing content of a received message (e.g., a voicemail message), and/or by other means.

At block 513, the system causes the voice assistant to initiate and conduct the telephone call to perform the task on behalf of the user. In some implementations, to initiate and conduct the telephone call, the system can cause the voice assistant to place the telephone call using an entity telephone number for the entity to engage with during the telephone call. During the telephone call, the system can generate, based on the task to be performed on behalf of the user, one or more instances of synthesized speech audio data that capture synthesized speech of the voice assistant, and cause the one or more instances of synthesized speech audio data to be audibly rendered via one or more speakers of an additional client device of the entity to engage with during the telephone call. In some implementations, during the telephone call, the system can further generate, based on the one or more instances of synthesized speech audio data and based on one or more instances of audio data that capture speech of a representative of the entity, a transcription of the telephone call. In these implementations, the system can cause the transcription of the telephone call to be rendered via the user interface of the client device, for review by the user. In additional or alternative implementations, the system can provide a summary of the telephone call upon the telephone call being completed, such as whether performance of the task was successful, what the representative of the entity said during the telephone call, and/or other information. In some implementations, during the telephone call, the system can cause a call participation suggestion element to be graphically/visually rendered via the user interface of the client device. The call participation suggestion element can be selectable and, when selected, causes the user to join the telephone call between the voice assistant and the entity. In addition to (or as an alternative of) rendering the call participation suggestion element, the system can cause a call cancellation element to be visually rendered via the client device. The call cancellation element can also be selectable, and when selected, cancels or terminates the telephone call.

Turning now to FIG. 6, an example method 600 of an automated call assistant automating a telephone call on behalf of a user is depicted. For convenience, the operations of the method 600 are described with reference to a system that performs the operations. This system of the method 600 includes one or more processors and/or other component(s) of computing device(s) (e.g., the on-device automated call assistant 140 of FIG. 1, the cloud-based automated call assistant 170 of FIG. 1, computing device 800 of FIG. 8, and/or other computing device(s)). Moreover, while operations of the method 600 are shown in a particular order, this is not meant to be limiting. One or more operations may be reordered, omitted, and/or added.

At block 601, the system receives, via a client device of a user, a voicemail message, the voicemail message being received from an entity and subsequent to a missed telephone call from the entity that was directed to the user. For example, and referring back to FIG. 4B, the voicemail message can include content ("Hey, this is Jennie from Example Cafe. You have a reservation for three tomorrow and we need you to confirm it by 8 pm or it will be canceled. Thank you!"). Additionally, or alternatively, the system receives a text-based message from an entity (e.g., a merchant, an organization, etc.) soliciting a response (e.g., confirmation) of a previous activity (e.g., a recent order, reservation, log-in activity, payment, etc.) of the user. Notably, in the method 600 of FIG. 6, and in contrast with the method 500 of FIG. 5, the entity (and a telephone number associated with the entity) can be readily identified based on the missed telephone call and/or the text-based message.

At block 603, the system determines whether a voice assistant is able to automate a return telephone call with the entity on behalf of the user. The system can determine whether the voice assistant is able to automate the return telephone call with the entity on behalf of the user based on, for example, the criteria described above with respect to block 505 of the method 500 of FIG. 5. If, at an iteration of block 603, the system determines that the voice assistant is not able to automate the return telephone call with the entity on behalf of the user, then the system returns to block 601 and to receive an additional voicemail message (or an additional text-based message) and perform an additional iteration of the method 600.

If, at an iteration of block 603, the system determines that the voice assistant is able to automate the return telephone call with the entity on behalf of the user, then the system proceeds to block 605. At block 605, the system causes an automated telephone call suggestion element to be rendered via a user interface of the client device and prior to initiating the return telephone call. The automated telephone call suggestion element can be selectable and, when selected, causes the voice assistant to automate the return telephone call on behalf of the user. As a non-limiting example, the automated telephone call suggestion element can be a selectable element displaying natural language content (e.g., "Let Automated Call Assistant place the call") that recommends the user to authorize the automated call assistant to automate the return telephone call on behalf of the user.

At block 607, the system determines whether a user selection of the automated telephone call suggestion element is received. The user selection can be, for example, a voice selection directed to the client device that is captured in audio data generated by microphone(s) of the client device or a touch selection directed to the automated telephone call suggestion element that is visually rendered at the user interface of the client device. If, at an iteration of block 607, the system determines that no user selection of the automated telephone call suggestion element is received, then the system returns to block 601 and to receive an additional voicemail message (or an additional text-based message) and perform an additional iteration of the method 600. For example, the system can return to block 601 from block 607 in response to determining that the user manually initiated the telephone call or that no user selection was directed to the automated telephone call suggestion element within a threshold duration of time of it being visually rendered for presentation to the user of the client device.

If, at an iteration of block 607, the system determines that a user selection of the automated telephone call suggestion element is received, then the system proceeds to block 609.

At block 609, the system determines a task to be performed on behalf of the user and during the return telephone call. As described herein, the system can determine the task to be performed based on utilizing one or more task suggestion elements, receiving natural language input directed to a natural language input field, analyzing content of a received message (e.g., a voicemail message), and/or by other means. However, in other implementations, the task to be performed on behalf of the user can be automatically determined based on analyzing content of the voicemail message (or the text-based message) such that the user need not provide any additional user input to determine the task.

At block 611, the system causes the voice assistant to initiate and conduct the return telephone call to perform the task on behalf of the user. The system can initiate and conduct the telephone call in the same or similar manner described above with respect to block 513 of the method 500 of FIG. 5.

Turning now to FIG. 7, an example method 700 of an automated call assistant automating a telephone call on behalf of a user is depicted. For convenience, the operations of the method 700 are described with reference to a system that performs the operations. This system of the method 700 includes one or more processors and/or other component(s) of computing device(s) (e.g., the on-device automated call assistant 140 of FIG. 1, the cloud-based automated call assistant 170 of FIG. 1, computing device 800 of FIG. 8, and/or other computing device(s)). Moreover, while operations of the method 700 are shown in a particular order, this is not meant to be limiting. One or more operations may be reordered, omitted, and/or added.

At block 701, the system can receive, via a client device of a user, a user selection of one or more entities from the user, the one or more entities being selected from a list of entities that are of a particular type and that are displayed via a user interface of the client device. The list of entities of the particular type can, for instance, be displayed as part of: a search engine results page that is displayed at the user interface of the client device, a maps/navigation page that is displayed at the user interface of the client device, and/or other via other software applications that are accessible at the client device.

At block 703, the system can determine whether a voice assistant is able to automate a corresponding telephone call with one or more of the entities on behalf of the user. The system can determine whether the voice assistant is able to automate the corresponding telephone call with one or more of the entities on behalf of the user based on, for example, the criteria described above with respect to block 505 of the method 500 of FIG. 5. If, at an iteration of block 703, the system determines that the voice assistant is not able to automate the corresponding telephone call with any of the entities on behalf of the user, then the system returns to block 701 and to receive an additional user selection of one or more additional entities and perform an additional iteration of the method 700.

If, at an iteration of block 703, the system determines that the voice assistant is able to automate the corresponding telephone calls with one or more of the entities on behalf of the user, then the system proceeds to block 705. Notably, the voice assistant may be able to automate the corresponding telephone calls with some of the entities, but not others. In these instances, the system can identify which entities, from among the one or more entities that the user selected from the list, that the voice assistant is able to automate the corresponding telephone calls with.

At block 705, the system causes an automated telephone call suggestion element to be rendered via a user interface of the client device and prior to initiating any of the corresponding telephone calls. The automated telephone call suggestion element can be selectable and, when selected, causes the voice assistant to automate the telephone call on behalf of the user. As a non-limiting example, the automated telephone call suggestion element can be a selectable element displaying natural language content (e.g., "Let Automated Call Assistant place the call") that recommends the user to authorize the automated call assistant to automate the telephone call on behalf of the user.

At block 707, the system determines whether a user selection of the automated telephone call suggestion element is received. The user selection can be, for example, a voice selection directed to the client device that is captured in audio data generated by microphone(s) of the client device or a touch selection directed to the automated telephone call suggestion element that is visually rendered at the user interface of the client device. If, at an iteration of block 707, the system determines that no user selection of the automated telephone call suggestion element is received, then the system returns to block 701 and to receive an additional user selection of one or more additional entities and perform an additional iteration of the method 700. For example, the system can return to block 701 from block 707 in response to determining that the user manually initiated one of the corresponding telephone calls or that no user selection was directed to the automated telephone call suggestion element within a threshold duration of time of it being visually rendered for presentation to the user of the client device.

If, at an iteration of block 707, the system determines that a user selection of the automated telephone call suggestion element is received, then the system proceeds to block 709. At block 709, the system causes one or more task suggestion elements to be rendered via the user interface of the client device and prior to initiating any of the corresponding telephone calls. Each of the one or more task suggestion elements can be selectable and, when selected, causes a respective task that is performable with respect to each of the one or more entities to be determined as a task to be performed on behalf of the user and during the corresponding telephone calls. Additionally, or alternatively, the system can cause a natural language input field to be rendered via the user interface of the client device. The natural language input field enables the user to provide a natural language description of the task to be performed during the corresponding telephone calls.

At block 711, the system determines whether there is a user selection of one or more of the task suggestion elements. The user selection can be, for example, a voice selection directed to the client device that is captured in audio data generated by microphone(s) of the client device or a touch selection directed to the automated telephone call suggestion element that is visually rendered at the user interface of the client device. If, at an iteration of block 711, the system determines that there is no user selection of one or more of the task suggestion elements, then the system continues monitoring for the user selection at block 711. If, at an iteration of block 711, the system determines that there is not a user selection of one or more of the task suggestion elements, then the system proceeds to block 713.

At block 713, the system causes the voice assistant to initiate and conduct the return telephone call to perform the task on behalf of the user. The system can initiate and conduct the telephone call in the same or similar manner described above with respect to block 513 of the method 500 of FIG. 5. However, in the method 700 of FIG. 7, it should be noted that the one or more entities selected by the user can include multiple entities. In these implementations, the corresponding telephone calls can be conducted in a serial manner or parallel manner. Further, as the voice assistant concludes the telephone calls, a corresponding summary of each of the corresponding telephone calls can be visually rendered for presentation to the user. This enables the user to monitor performance of the corresponding telephone call in real-time. For instance, if a given telephone call with a given entity, of the one or more entities that were selected by the user, produces a desired result, then the user can provide input to cancel any remaining telephone calls, thereby conserving computational resources.

Figure 8:
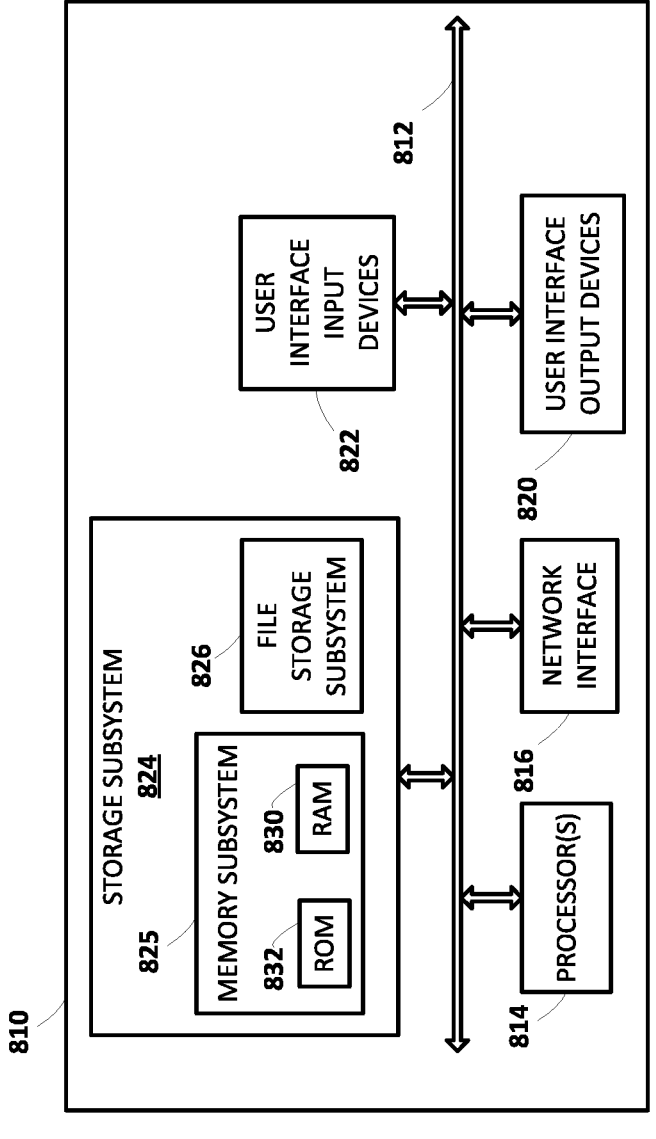
FIG. 8 depicts an example architecture of a computing device, in accordance with various implementations.

Turning now to FIG. 8, a block diagram of an example computing device 810 that may optionally be utilized to perform one or more aspects of techniques described herein is depicted. In some implementations, one or more of a client device, cloud-based automated assistant component(s), and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the methods disclosed herein, as well as to implement various components depicted in FIG. 1.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem 812 may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes receiving, via a client device and from a user of the client device, user input to initiate a telephone call; identifying, based on the user input, an entity to engage with during the telephone call; determining whether a voice assistant is able to automate the telephone call with the entity on behalf of the user; and in response to determining that the voice assistant is able to automate the telephone call with the entity on behalf of the user and prior to initiating the telephone call: causing an automated telephone call suggestion element to be rendered via a user interface of the client device. The automated telephone call suggestion element is selectable and, when selected, causes the voice assistant to automate the telephone call on behalf of the user. The method further includes receiving, via the client device and from the user, a user selection of the automated telephone call suggestion element that causes the voice assistant to automate the telephone call on behalf of the user; and in response to receiving the user selection of the automated telephone call suggestion selectable element that cause the voice assistant to automate the telephone call on behalf of the user: determining a task to be performed on behalf of the user and during the telephone call, and causing the voice assistant to initiate and conduct the telephone call to perform the task on behalf of the user.

These and other implementations of technology disclosed herein can optionally include one or more of the following features.

In some implementations, determining the task to be performed on behalf of the user and during the telephone call can include: identifying one or more tasks that are associated with the entity to engage with during the telephone call; and generating, based on the identified one or more tasks, one or more task suggestion elements. Each of the one or more task suggestion elements can be selectable and, when selected, causes a respective task of the identified one or more tasks to be determined as the task to be performed on behalf of the user and during the telephone call. The method can further include causing the one or more task suggestion elements to be rendered via the user interface of the client device; receiving, via the client device and from the user, an additional user selection of a particular task suggestion element, of the one or more task suggestion elements, that suggests a particular task; and determining, based on the additional user selection of the particular task suggestion element, the particular task as the task to be performed on behalf of the user and during the telephone call.

In some versions of those implementations, identifying the one or more tasks that are associated with the entity to engage with during the telephone call can include identifying the one or more tasks based on a type of the entity.

In additional or alternative versions of those implementations, identifying the one or more tasks that are associated with the entity to engage with during the telephone call can include identifying the one or more tasks based on one or more prior interactions involving the user and the entity. In some further versions of those implementations, the one or more prior interactions can include a prior message or call between the user and the entity, a browsing history of the user, or a searching history of the user.

In some implementations, causing the voice assistant to initiate and conduct the telephone call to perform the task on behalf of the user can include causing the voice assistant to place the telephone call using an entity telephone number for the entity to engage with during the telephone call; and during the telephone call: generating, based on the task to be performed on behalf of the user, one or more instances of synthesized speech audio data that capture synthesized speech of the voice assistant, and causing the one or more instances of synthesized speech audio data to be audibly rendered via one or more speakers of an additional client device of the entity to engage with during the telephone call.

In some versions of those implementations, during the telephone call, the method can further include generating, based on the one or more instances of synthesized speech audio data and based on one or more instance of audio data that capture speech of a representative of the entity, a transcription of the telephone call; and causing the transcription of the telephone call to be rendered via the user interface of the client device.

In additional or alternative versions of those implementations, during the telephone call, the method can further include causing a call participation suggestion element to be graphically rendered via the user interface of the client device. The call participation suggestion element can be selectable and, when selected, causes the user to join the telephone call between the voice assistant and the entity.

In some implementations, the method can further include determining operating hours that are associated with the entity to engage with during the telephone call; and in response to determining that a current time is not within the operating hours that are associated with the entity, delaying causing the voice assistant to initiate and conduct the telephone call until a future time that is within the operating hours, wherein the future time is subsequent to the current time.

In some implementations, determining the task to be performed on behalf of the user and during the telephone call can include: causing a natural language input field to be graphically rendered via the user interface of the client device, and determining, based on natural language input provided by the user via the natural language input field, the task to be performed on behalf of the user and during the telephone call.

In some implementations, a method implemented by one or more processors is provided, and includes receiving, via a client device of a user, a voicemail message, the voicemail message being received from an entity and subsequent to a missed telephone call from the entity that was directed to the user; determining whether a voice assistant is able to automate a return telephone call with the entity on behalf of the user that is responsive to the missed telephone call; in response to determining that the voice assistant is able to automate the return telephone call with the entity on behalf of the user: causing an automated telephone call suggestion element to be rendered via a user interface of the client device; receiving, via the client device and from the user, a user selection of the automated telephone call suggestion element that causes the voice assistant to automate the return telephone call on behalf of the user; and in response to receiving the user selection of the automated telephone call suggestion element that causes the voice assistant to automate the return telephone call on behalf of the user: determining a task to be performed on behalf of the user and during the return telephone call; and causing the voice assistant to initiate and conduct the return telephone call to perform the task on behalf of the user. The automated telephone call suggestion element is selectable and, when selected, causes the voice assistant to automate the return telephone call on behalf of the user.

These and other implementations of technology disclosed herein can optionally include one or more of the following features.

In some implementations, determining the task to be performed on behalf of the user and during the return telephone call can include automatically, based on content of the voicemail message, determining the task to be performed on behalf of the user and during the return telephone call.

In some implementations, determining the task to be performed on behalf of the user and during the return telephone call can include causing a natural language input field to be graphically rendered via the user interface of the client device, and determining, based on natural language input provided by the user via the natural language input field, the task to be performed on behalf of the user and during the return telephone call.

In some implementations, the method can further include causing a transcript of the voicemail message to be rendered via the user interface of the client device voicemail message and along with the automated telephone call suggestion element.

In some implementations, the method can further include determining, based on content of the voicemail message, a deadline to respond to the voicemail message. In these implementations, causing the voice assistant to initiate and conduct the return telephone call to perform the task on behalf of the user can include causing the voice assistant to initiate and conduct the telephone to perform the task on behalf of the user prior to the deadline.

In some implementations, causing the voice assistant to initiate and conduct the return telephone call to perform the task on behalf of the user can include causing the voice assistant to place the return telephone call using an entity telephone number for the entity to engage with during the telephone call; and during the telephone call: generating, based on the task to be performed on behalf of the user, one or more instances of synthesized speech audio data that capture synthesized speech of the voice assistant, and causing the one or more instances of synthesized speech audio data to be audibly rendered via one or more speakers of an additional client device of the entity to engage with during the telephone call.

In some versions of those implementations, during the telephone call, the method can further include: generating, based on the one or more instances of synthesized speech audio data and based on one or more instance of audio data that capture speech of a representative of the entity, a transcription of the telephone call; and causing the transcription of the telephone call to be rendered via the user interface of the client device.

In some implementations, a method implemented by one or more processors is provided, and includes: receiving, via a client device of a user, a user selection of one or more entities from the user, the one or more entities selected from a list of entities of a particular type that are displayed via a user interface of the client device; determining whether a voice assistant is able to automate a corresponding telephone call with one or more of the entities on behalf of the user; in response to determining that the voice assistant is able to automate a corresponding telephone call with one or more of the entities on behalf of the user: causing an automated telephone call suggestion element to be rendered via the user interface of the client device, in response to receiving a user selection of the automated telephone call suggestion elements: causing one or more task suggestion elements to be rendered via the user interface of the client device; in response to receiving an additional user selection that selects a particular task suggestion element, of the one or more task suggestion elements, that suggests a particular task to be performed during the telephone call: causing the voice assistant to initiate and conduct the corresponding telephone calls to perform the particular task with the one or more of the entities on behalf of the user. The automated telephone call suggestion element is selectable and, when selected, causes the voice assistant to automate the corresponding telephone calls on behalf of the user. Further, each of the one or more task suggestion elements are selectable and, when selected, causes a respective task that is performable with respect to one or more of the entities to be determined as a task to be performed on behalf of the user and during the corresponding telephone calls.

These and other implementations of technology disclosed herein can optionally include one or more of the following features.

In some implementations, the list of entities of the particular type can be displayed as part of: a search results page that is displayed at the user interface of the client device, or a maps page that is displayed at the user interface of the client device.

In some implementations, causing the voice assistant to initiate and conduct the corresponding telephone calls can include: causing the voice assistant to place the telephone call using a corresponding entity telephone number for the one or more of the entities; and during each of the corresponding telephone calls: generating, based on the particular task to be performed on behalf of the user, one or more corresponding instances of synthesized speech audio data that capture corresponding synthesized speech of the voice assistant, and causing the one or more corresponding instances of synthesized speech audio data to be audibly rendered via one or more corresponding speakers of a corresponding additional client device of each of the one or more entities to engage with during the corresponding telephone calls.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A computer-implemented method, comprising:

receiving, via a client device and from a user of the client device, user input to initiate a telephone call;

identifying, based on the user input, an entity to engage with during the telephone call;

determining whether a voice assistant is able to automate the telephone call with the entity on behalf of the user;

in response to determining that the voice assistant is able to automate the telephone call with the entity on behalf of the user and prior to initiating the telephone call:

causing an automated telephone call suggestion element to be rendered via a user interface of the client device, wherein the automated telephone call suggestion element is selectable and, when selected, causes the voice assistant to automate the telephone call on behalf of the user;

receiving, via the client device and from the user, a user selection of the automated telephone call suggestion element that causes the voice assistant to automate the telephone call on behalf of the user; and in response to receiving the user selection of the automated telephone call suggestion selectable element that causes the voice assistant to automate the telephone call on behalf of the user:

determining a task to be performed on behalf of the user and during the telephone call, and causing the voice assistant to initiate and conduct the telephone call to perform the task on behalf of the user.

2. The method of claim 1, wherein determining the task to be performed on behalf of the user and during the telephone call comprises:

identifying one or more tasks that are associated with the entity to engage with during the telephone call;

generating, based on the identified one or more tasks, one or more task suggestion elements, wherein each of the one or more task suggestion elements are selectable and, when selected, causes a respective task of the identified one or more tasks to be determined as the task to be performed on behalf of the user and during the telephone call;

causing the one or more task suggestion elements to be rendered via the user interface of the client device;

receiving, via the client device and from the user, an additional user selection of a particular task suggestion element, of the one or more task suggestion elements, that suggests a particular task; and determining, based on the additional user selection of the particular task suggestion element, the particular task as the task to be performed on behalf of the user and during the telephone call.

3. The method of claim 2, wherein identifying the one or more tasks that are associated with the entity to engage with during the telephone call comprises identifying the one or more tasks based on a type of the entity.

4. The method of claim 2, wherein identifying the one or more tasks that are associated with the entity to engage with during the telephone call comprises identifying the one or more tasks based on one or more prior interactions involving the user and the entity.

5. The method of claim 4, wherein the one or more prior interactions include a prior message or call between the user and the entity, a browsing history of the user, or a searching history of the user.

6. The method of claim 1, wherein causing the voice assistant to initiate and conduct the telephone call to perform the task on behalf of the user comprises:

causing the voice assistant to place the telephone call using an entity telephone number for the entity to engage with during the telephone call; and during the telephone call:

generating, based on the task to be performed on behalf of the user, one or more instances of synthesized speech audio data that capture synthesized speech of the voice assistant, and causing the one or more instances of synthesized speech audio data to be audibly rendered via one or more speakers of an additional client device of the entity to engage with during the telephone call.

7. The method of claim 6, during the telephone call, further comprising:

generating, based on the one or more instances of synthesized speech audio data and based on one or more instance of audio data that capture speech of a representative of the entity, a transcription of the telephone call; and causing the transcription of the telephone call to be rendered via the user interface of the client device.

8. The method of claim 6, during the telephone call, further comprising:

causing a call participation suggestion element to be graphically rendered via the user interface of the client device, wherein the call participation suggestion element is selectable and, when selected, causes the user to join the telephone call between the voice assistant and the entity.

9. The method of claim 1, further comprising:

determining operating hours that are associated with the entity to engage with during the telephone call; and in response to determining that a current time is not within the operating hours that are associated with the entity, delaying causing the voice assistant to initiate and conduct the telephone call until a future time that is within the operating hours, wherein the future time is subsequent to the current time.

10. The method of claim 1, wherein determining the task to be performed on behalf of the user and during the telephone call comprises:

causing a natural language input field to be graphically rendered via the user interface of the client device, and determining, based on natural language input provided by the user via the natural language input field, the task to be performed on behalf of the user and during the telephone call.

11. A system, comprising:

at least one processor; and memory storing instructions that, when executed, cause the at least one processor to be operable to:

receive, via a client device and from a user of the client device, user input to initiate a telephone call;

identify, based on the user input, an entity to engage with during the telephone call;

determine whether a voice assistant is able to automate the telephone call with the entity on behalf of the user;

in response to determining that the voice assistant is able to automate the telephone call with the entity on behalf of the user and prior to initiating the telephone call:

cause an automated telephone call suggestion element to be rendered via a user interface of the client device, wherein the automated telephone call suggestion element is selectable and, when selected, causes the voice assistant to automate the telephone call on behalf of the user;

receive, via the client device and from the user, a user selection of the automated telephone call suggestion element that causes the voice assistant to automate the telephone call on behalf of the user; and in response to receiving the user selection of the automated telephone call suggestion selectable element that causes the voice assistant to automate the telephone call on behalf of the user:

determine a task to be performed on behalf of the user and during the telephone call, and cause the voice assistant to initiate and conduct the telephone call to perform the task on behalf of the user.

12. The system of claim 11, wherein the instructions to determine the task to be performed on behalf of the user and during the telephone call comprise instructions to:

cause a natural language input field to be graphically rendered via the user interface of the client device, and determine, based on natural language input provided by the user via the natural language input field, the task to be performed on behalf of the user and during the telephone call.

13. The system of claim 12, wherein the instructions to determine the task to be performed on behalf of the user and during the telephone call comprise instructions to:

identify one or more tasks that are associated with the entity to engage with during the telephone call;

generate, based on the identified one or more tasks, one or more task suggestion elements, wherein each of the one or more task suggestion elements are selectable and, when selected, causes a respective task of the identified one or more tasks to be determined as the task to be performed on behalf of the user and during the telephone call;

cause the one or more task suggestion elements to be rendered via the user interface of the client device;

receive, via the client device and from the user, an additional user selection of a particular task suggestion element, of the one or more task suggestion elements, that suggests a particular task; and determine, based on the additional user selection of the particular task suggestion element, the particular task as the task to be performed on behalf of the user and during the telephone call.

14. The system of claim 13, wherein the instructions to identify the one or more tasks that are associated with the entity to engage with during the telephone call comprise instructions to identify the one or more tasks based on a type of the entity.

15. The system of claim 13, wherein the instructions to identify the one or more tasks that are associated with the entity to engage with during the telephone call comprise instructions to identify the one or more tasks based on one or more prior interactions involving the user and the entity.

16. The system of claim 15, wherein the one or more prior interactions include a prior message or call between the user and the entity, a browsing history of the user, or a searching history of the user.

17. The system of claim 12, wherein the instructions to cause the voice assistant to initiate and conduct the telephone call to perform the task on behalf of the user comprise instructions to:

cause the voice assistant to place the telephone call using an entity telephone number for the entity to engage with during the telephone call; and during the telephone call:

generate, based on the task to be performed on behalf of the user, one or more instances of synthesized speech audio data that capture synthesized speech of the voice assistant, and cause the one or more instances of synthesized speech audio data to be audibly rendered via one or more speakers of an additional client device of the entity to engage with during the telephone call.

18. The system of claim 17, during the telephone call, the instructions further cause the at least one processor to be operable to:

generate, based on the one or more instances of synthesized speech audio data and based on one or more instance of audio data that capture speech of a representative of the entity, a transcription of the telephone call; and cause the transcription of the telephone call to be rendered via the user interface of the client device.

19. The system of claim 17, during the telephone call, the instructions further cause the at least one processor to be operable to:

cause a call participation suggestion element to be graphically rendered via the user interface of the client device, wherein the call participation suggestion element is selectable and, when selected, causes the user to join the telephone call between the voice assistant and the entity.

20. The system of claim 12, the instructions further cause the at least one processor to be operable to:

determine operating hours that are associated with the entity to engage with during the telephone call; and in response to determining that a current time is not within the operating hours that are associated with the entity, delay causing the voice assistant to initiate and conduct the telephone call until a future time that is within the operating hours, wherein the future time is subsequent to the current time.

\* \* \* \* \*